United States Patent [19]
Haynie

[11] Patent Number: 5,276,887
[45] Date of Patent: Jan. 4, 1994

[54] BUS ARBITRATION SYSTEM FOR GRANTING BUS ACCESS TO DEVICES FOLLOWING TWO-WIRE BUS ARBITRATION PROTOCOL AND DEVICES FOLLOWING THREE-WIRE BUS ARBITRATION PROTOCOL

[75] Inventor: David B. Haynie, Gibbstown, N.J.

[73] Assignee: Commodore Electronics Limited, Nassau, The Bahamas

[21] Appl. No.: 710,886

[22] Filed: Jun. 6, 1991

[51] Int. Cl.$^5$ .................................. G06F 13/36
[52] U.S. Cl. ........................ 395/725; 340/825.51; 370/85.6; 364/240.8; 364/240.1; 364/242.92; 364/DIG. 1
[58] Field of Search .......... 395/725, 325, 425, 800; 340/825.5, 825.51, 825.2; 370/85.1, 85.2, 85.6, 85.8; 371/68.1

[56] References Cited

U.S. PATENT DOCUMENTS

| | | | |
|---|---|---|---|
| 4,334,288 | 6/1982 | Booher | 364/200 |
| 4,381,542 | 4/1983 | Binder et al. | 364/200 |
| 4,648,029 | 3/1987 | Cooper et al. | 364/200 |
| 4,752,872 | 6/1988 | Ballatore et al. | 364/200 |
| 4,779,089 | 10/1988 | Theus | 340/825.5 |
| 4,803,617 | 2/1989 | Berarducci | 364/200 |
| 4,837,682 | 6/1989 | Culler | 364/200 |
| 4,964,034 | 10/1990 | Jaskowiak | 364/200 |
| 4,979,100 | 12/1990 | Makris et al. | 364/200 |
| 5,081,576 | 1/1992 | Ward | 395/325 |
| 5,119,292 | 6/1992 | Bakes et al. | 395/725 |
| 5,148,545 | 9/1992 | Herbst et al. | 395/725 |
| 5,151,994 | 9/1992 | Wille et al. | 395/800 |

*Primary Examiner*—Michael R. Fleming
*Assistant Examiner*—Gopal C. Ray
*Attorney, Agent, or Firm*—Panitch Schwarze Jacobs & Nadel

[57] ABSTRACT

A bus arbitration system is capable of granting access to an expansion bus to devices following two-wire bus arbitration protocol or a three-wire bus arbitration protocol. The bus arbitration system receives a plurality of bus request signals from a plurality of devices. Each bus request signal is made up of one or more coded pulses and has a predetermined priority. A priority encoder receives the bus request signal and assigns a priority level to each bus request signal. An arbiter determines and stores in memory which bus request signal has a highest priority and whether the device follows two-wire bus arbitration protocol or a three-wire bus arbitration protocol. The expansion bus grants access to the bus to the device having the highest priority once a previous device if any, has relinquished the bus.

30 Claims, 37 Drawing Sheets

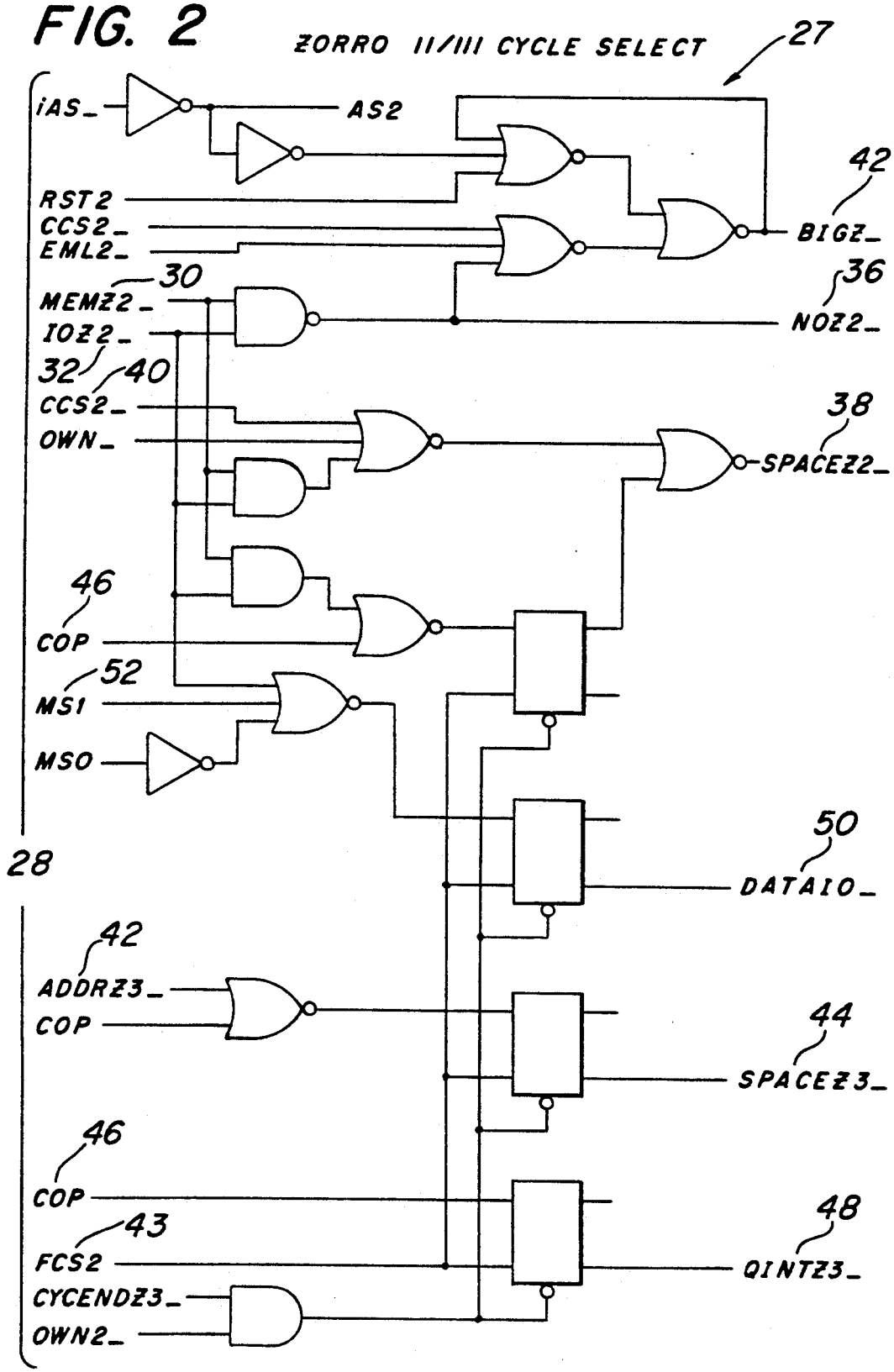

FIG. 27    MULTIPLE TRANSFER STROBE

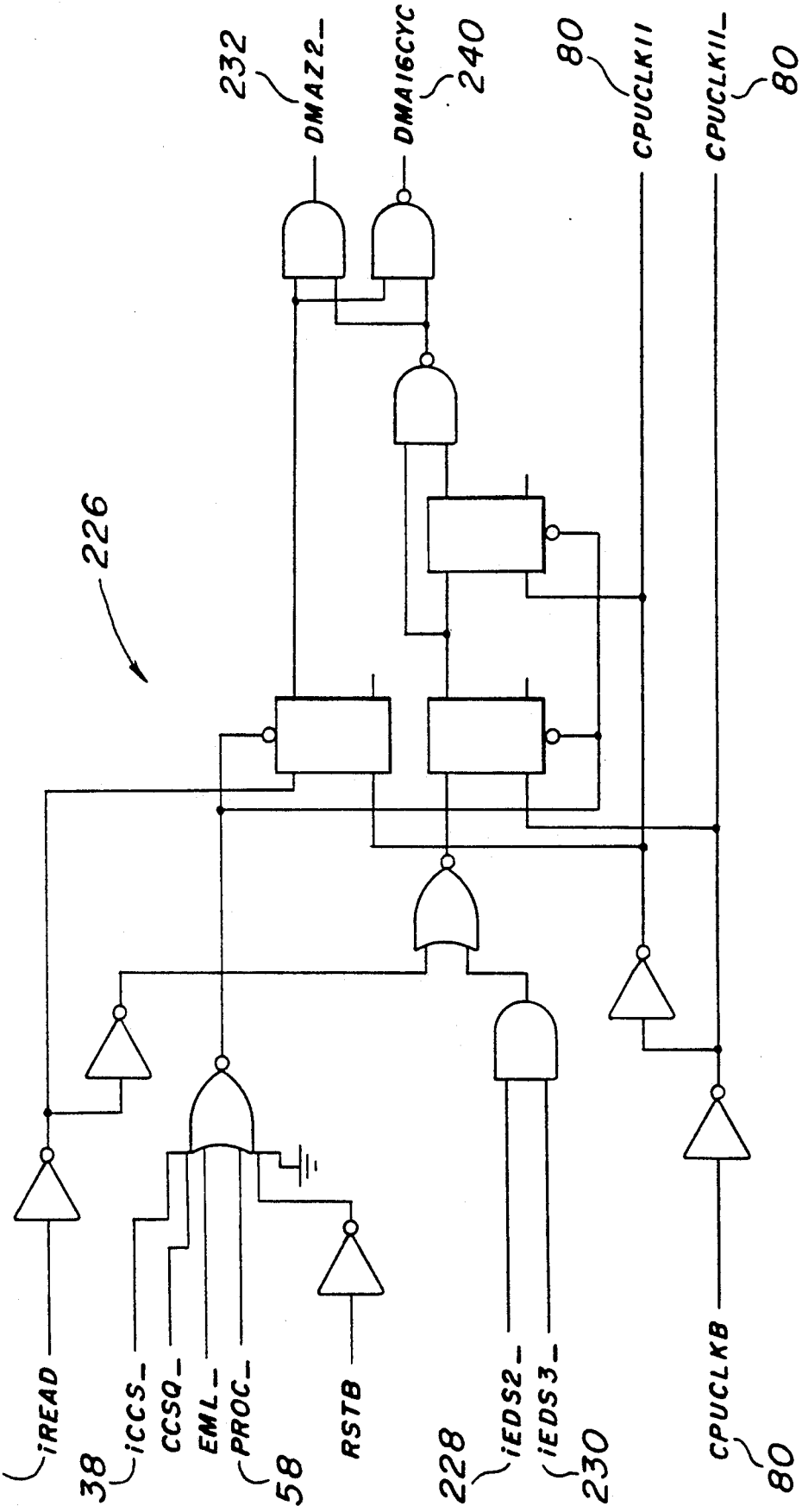
FIG. 31    16 BIT DMA SYNCHRONIZER

FIG. 32 CYCLE TERMINATION & DTACK GENERATOR

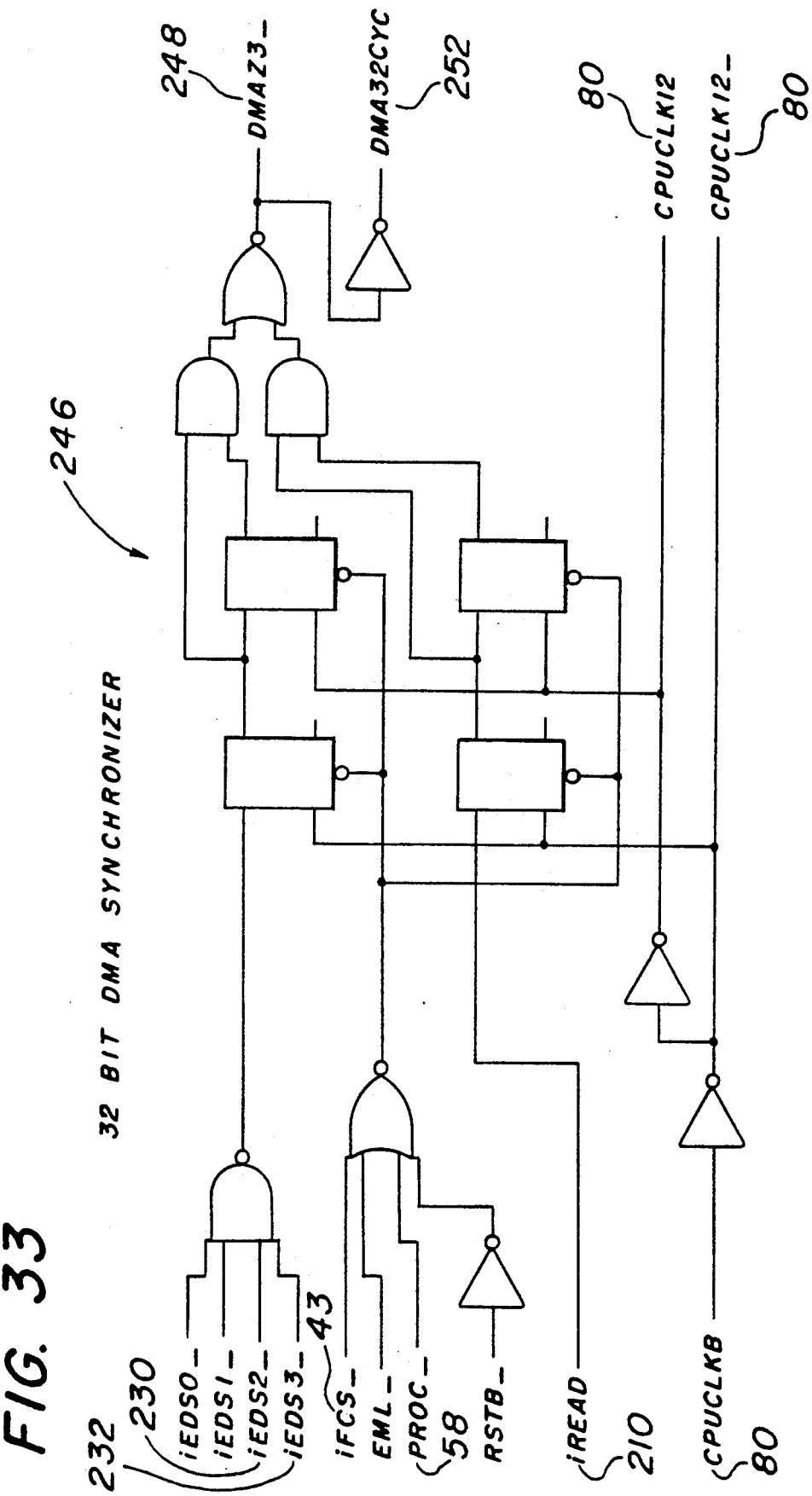

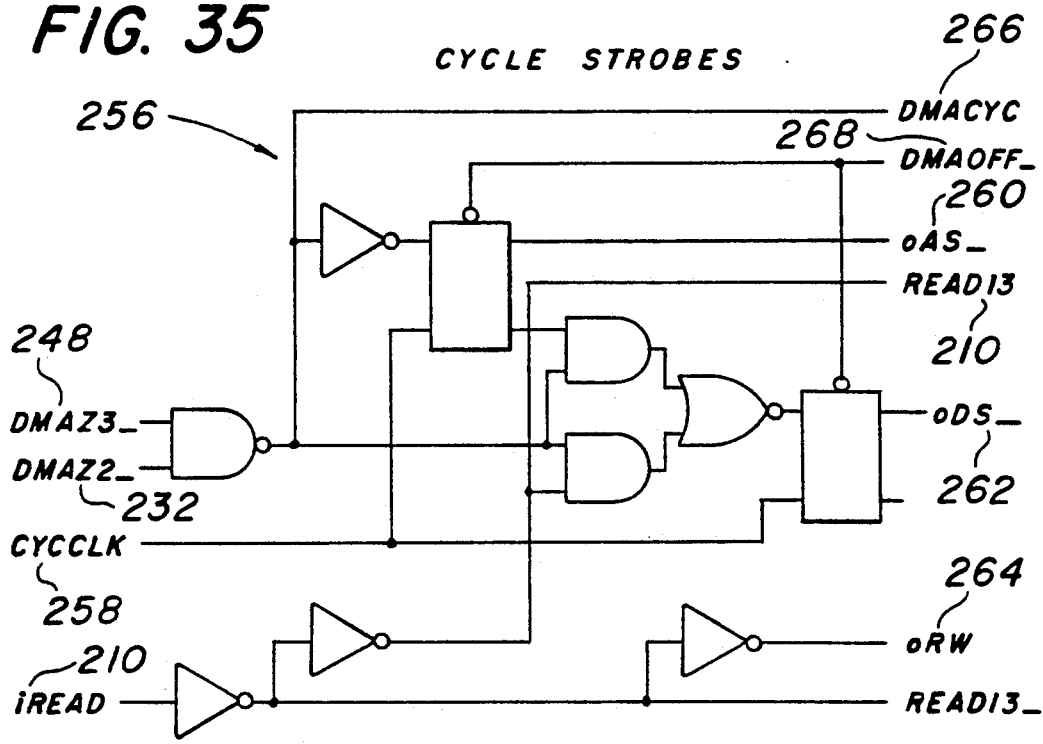
FIG. 35 CYCLE STROBES
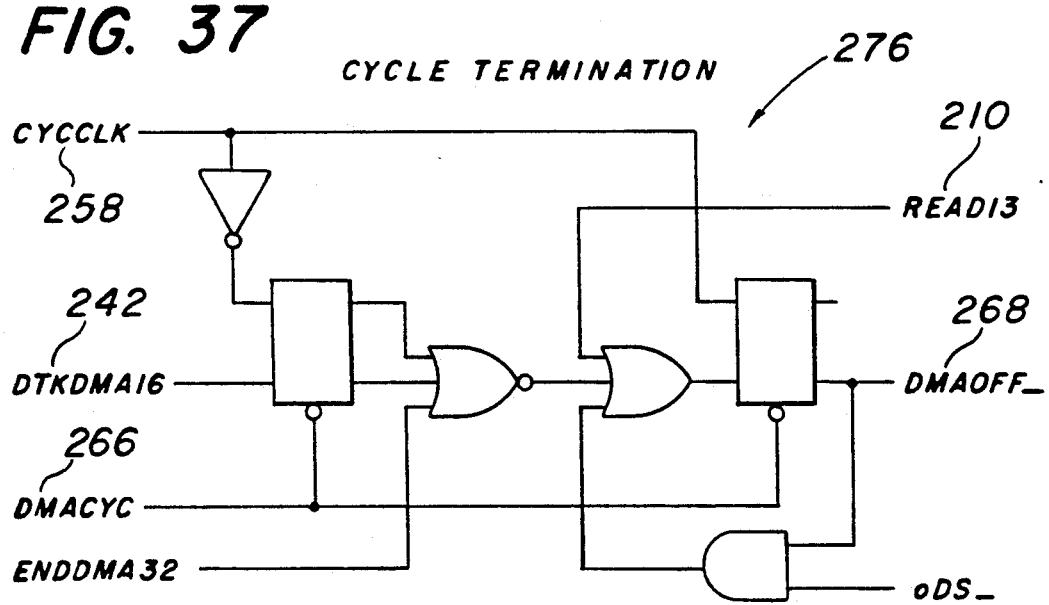
FIG. 37 CYCLE TERMINATION

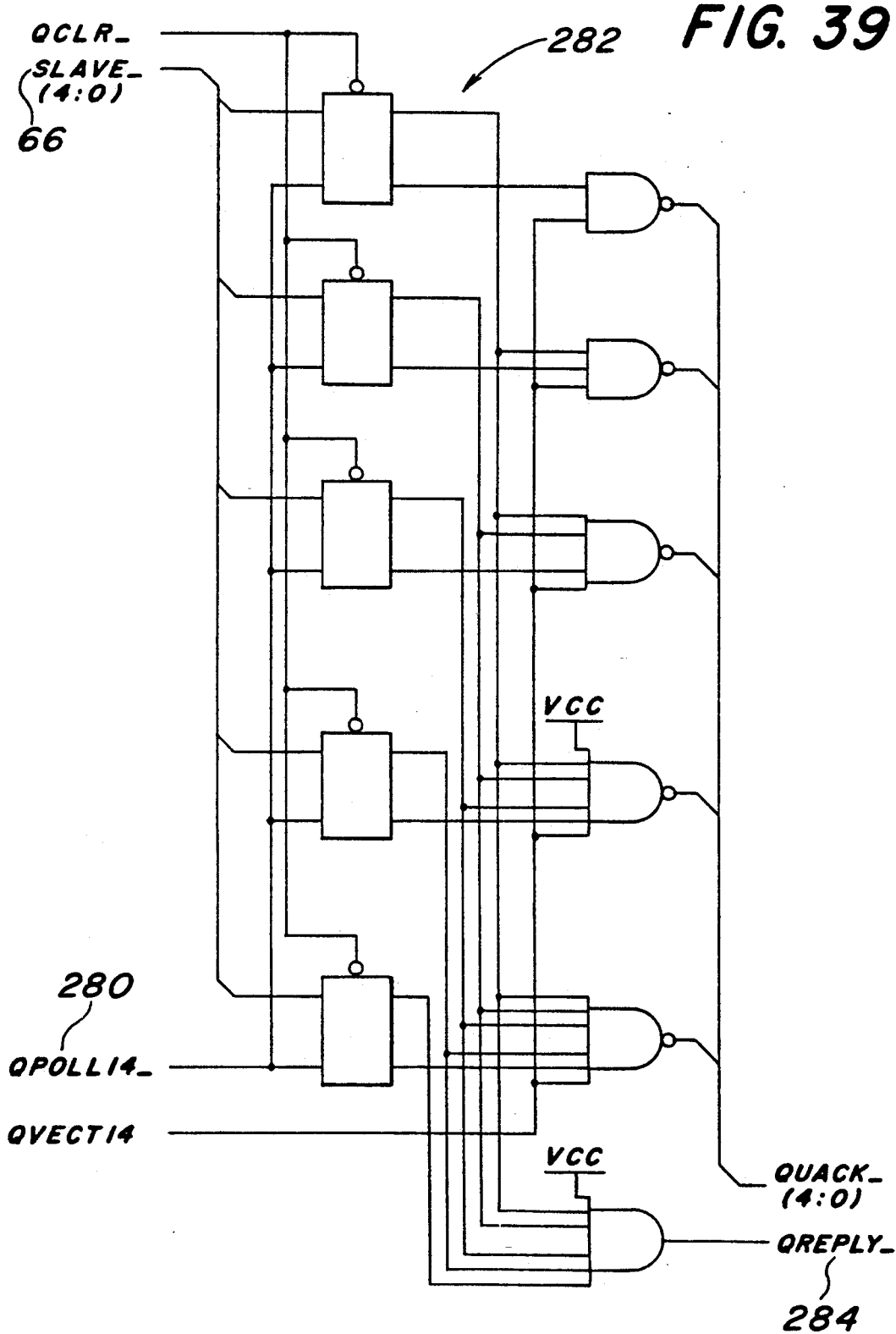
FIG. 39 INTERRUPT ARBITER

BUS ARBITRATION SYSTEM FOR GRANTING BUS ACCESS TO DEVICES FOLLOWING TWO-WIRE BUS ARBITRATION PROTOCOL AND DEVICES FOLLOWING THREE-WIRE BUS ARBITRATION PROTOCOL

BACKGROUND OF THE INVENTION

The present invention relates to a bus arbitration system and, more particularly, to a bus arbitration system for granting access to an expansion bus to devices following two-wire bus arbitration protocol or three-wire bus arbitration protocol.

Many existing devices, such as the Motorola 68000 type of devices follow three-wire bus arbitration protocol. In order for such a device to access the bus, the device must assert a bus request strobe. When the bus recognizes the device and chooses to allow the device to access the bus, the bus asserts a grant strobe to the device. Upon receipt of the bus grant strobe, the device asserts a bus grant acknowledge strobe to the bus confirming that the device is accessing the bus.

It is important to most system users that a system be easy to access and that data can be processed as quickly as possible. Therefore, any short cuts which can be taken or design changes which can be made to accelerate processing time are desirable. In most systems, it is unnecessary to have both a grant signal asserted by the bus and an acknowledgment signal asserted by the device.

The present invention is directed to a bus arbitration system which follows two-wire bus arbitration protocol. A device seeking access to the bus asserts a bus request strobe to the bus. When the bus wishes to give the device access to the bus, the bus asserts a grant strobe to the device. Since only two signals are necessary to provide a device access to the bus, the processing time of the system is significantly decreased. Furthermore, only two wires are needed to process bus requests.

In addition, the two-wire bus arbitration protocol is an asynchronous system which is capable of running independently of the microprocessor clock. Most three-wire bus arbitration protocol devices are synchronous devices which must be driven in accordance to certain edges of the microprocessors clock cycle. This can be time consuming and delay processing time since a device may be ready prior to when the appropriate clock edge is detected.

While a two-wire arbitration protocol system is more efficient than a three-wire bus arbitration protocol system, a bus arbitration system which cannot accept devices which follow three-wire bus arbitration protocol as well as devices which follow two-wire arbitration protocol will be at a significant disadvantage. Since most of the present devices are three-wire bus arbitration protocol devices, a bus arbitration system which cannot accept these devices will cause these devices to become obsolete. This will result in a majority of the devices having to be redesigned which will be at great cost to the system user as well as possibly hampering a system user from performing certain procedures.

Therefore, it is desirable to have a bus arbitration system which follows two-wire bus arbitration protocol and which is capable of accepting devices which follow three-wire bus arbitration protocol. In this way, system users can still use their three-wire bus arbitration protocol devices while upgrading to newer devices which follow two-wire arbitration protocol and thus are more efficient. In addition, devices requesting access to the bus can be prioritized so that devices following two-wire bus arbitration protocol can gain access to the expansion bus before devices following three-wire bus arbitration protocol. This will significantly speed up processing time and produce a more efficient system.

SUMMARY OF THE INVENTION

Briefly stated, the present invention comprises a bus arbitration system capable of granting access to an expansion bus to devices following two-wire bus arbitration protocol or three-wire bus arbitration protocol. The bus arbitration system comprises means for receiving a plurality of bus request signals from a plurality of devices. Each bus request signal is made up one or more coded pulses and has a predetermined priority. Each bus request signal is used to request access to the expansion bus. A priority encoder receives the bus request signals and assigns a priority level to each bus request signal. Arbiter means determine and store in memory which bus request signal has the highest priority and whether the device follows two-wire bus arbitration protocol or three-wire bus arbitration protocol. Bus granting means grant access of the expansion bus to the device having the highest priority once a previous device, if any has relinquished the bus. The arbiter means transmits from its memory to the bus granting means whether the device having the highest priority is a device following two-wire bus arbitration protocol or a three-wire bus arbitration protocol. The bus granting means further includes interfacing means for following two-wire bus arbitration protocol if the device follows two-wire bus arbitration protocol or the interfacing means following three-wire bus arbitration protocol if the device follows three-wire bus arbitration protocol.

BRIEF DESCRIPTION OF THE DRAWINGS

The foregoing summary, as well as the following detailed description of preferred embodiments, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings:

FIG. 2 is a schematic of a cycle select circuit of the bus arbitration system of FIG. 1;

FIG. 31 is a schematic of a 16 bit DMA synchronizer of the bus arbitration system of FIG. 1;

FIG. 32 is a schematic of a 16 bit cycle termination and DTACK generator of the bus arbitration system of FIG. 1;

FIG. 33 is a schematic of a 32 bit DMA synchronizer of the bus arbitration system of FIG. 1;

FIG. 35 is a schematic of a cycle strobe circuit of the bus arbitration system of FIG. 1;

FIG. 37 is a schematic of a cycle termination circuit of the bus arbitration system of FIG. 1;

FIG. 39 is a schematic of an interrupt arbiter of the bus arbitration system of FIG. 1.

DETAILED DESCRIPTION OF THE PREFERRED EMBODIMENT

Figure 1A:
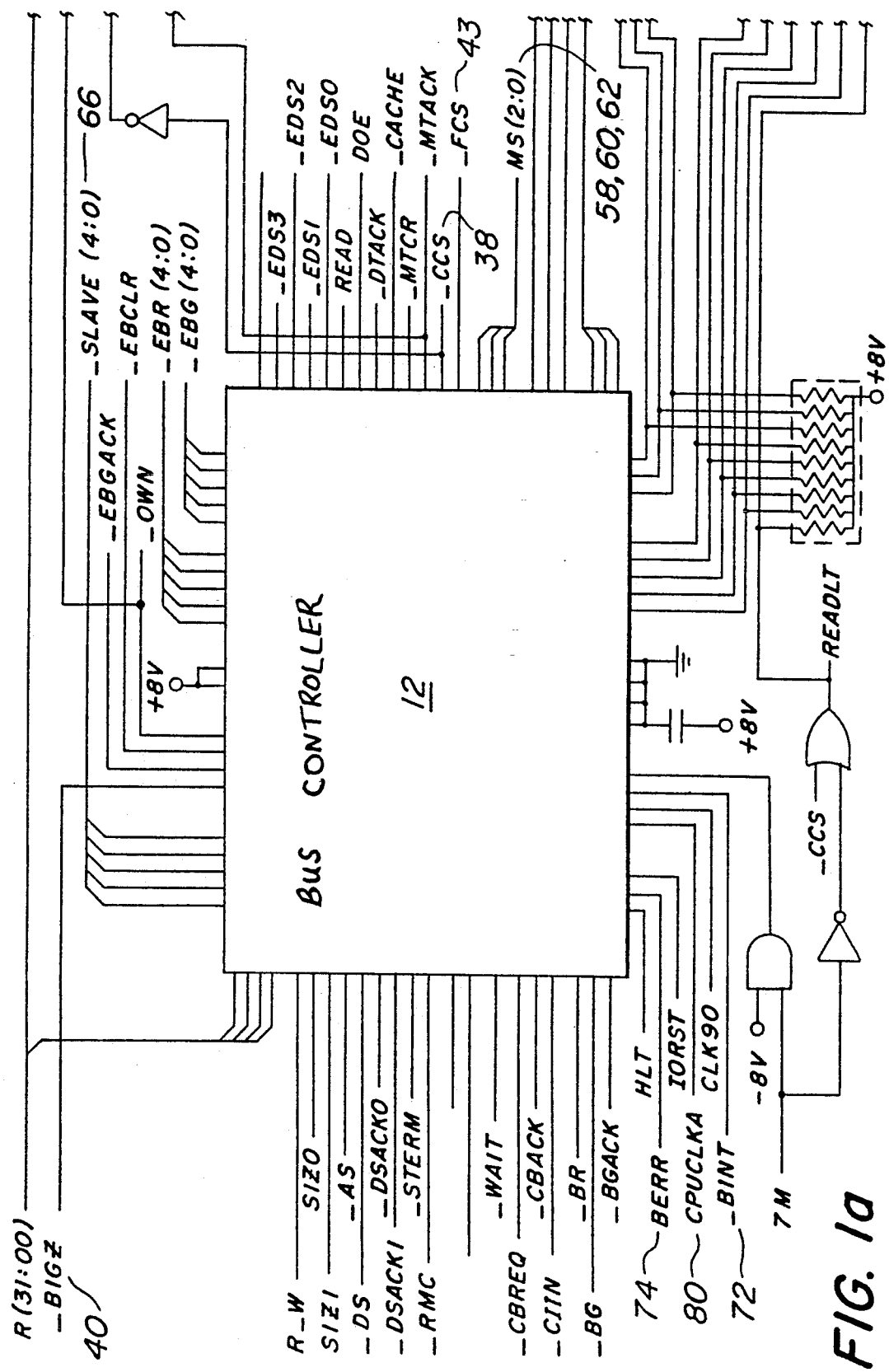
FIGS. 1a–1c are collectively a schematic of the overall bus arbitration system in accordance with the present invention.
Figure 1B:
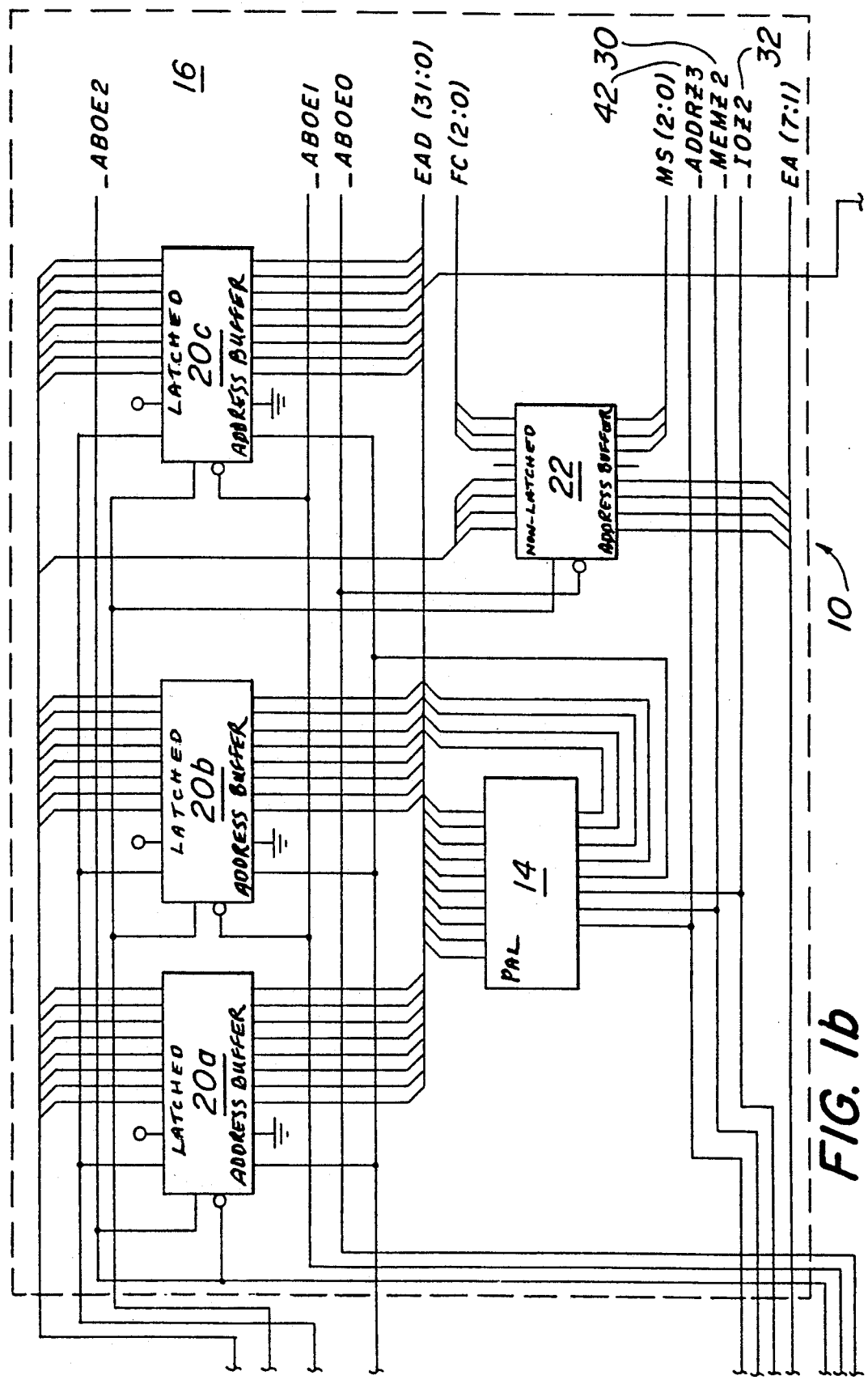
Figure 1C:
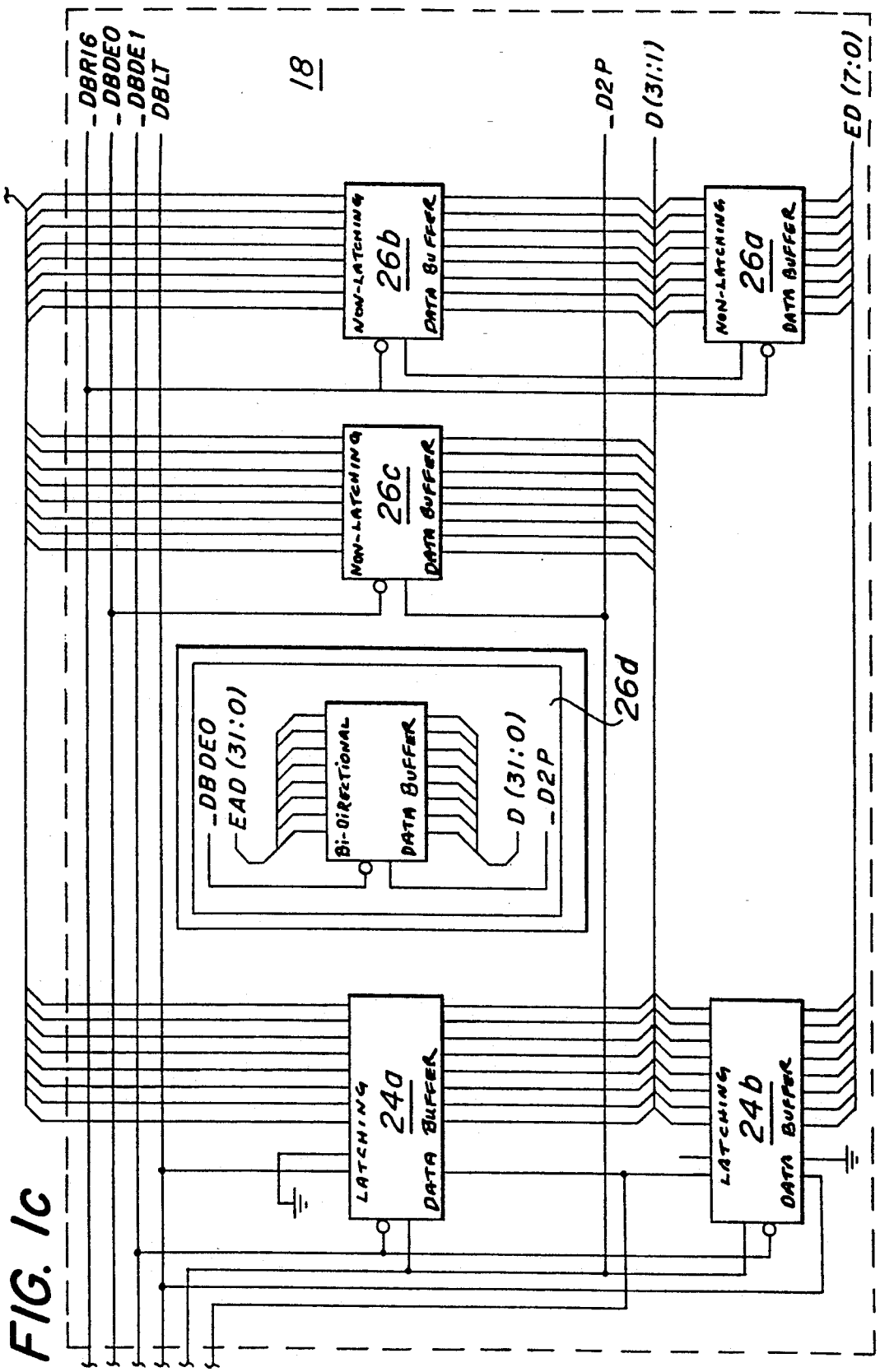

Referring to the drawings, wherein like numerals equal like elements throughout, there is shown in FIGS. 1a–1c a bus arbitration system 10 which is implemented in conjunction with a 32 bit high performance processor (not shown) and a plurality of devices (not shown) requesting access to a 32 bit expansion bus. In the preferred embodiment, the 32 bit processor is preferably a 68030 manufactured by Motorola. However, it is to be understood by those skilled in the art that any processor could be adapted to be used with the expansion bus.

The 32 bit expansion bus follows two-wire bus arbitration protocol and is upwardly compatible with an expansion bus having three-wire bus arbitration protocol. The two-wire expansion bus allows fast 32 bit peripherals and memory devices to be added to the high performance processor while at the same time allows standard three-wire bus arbitration protocol devices to be capable of being implemented into the system. The two-wire expansion bus is primarily driven by integrated bus controller chip 12. The bus controller chip 12 contains the majority of the intelligence of the bus arbitration system 10 and is capable of distinguishing between devices following two-wire bus arbitration protocol (new style) and devices following three-wire bus arbitration protocol (old style). The bus controller chip 12 controls ten external buffer chips and one programmable array logic (PAL) device 14. The buffer chips are divided into an address sector 16 and a data sector 18.

The address sector 16 includes three latched address buffers 20a, 20b and 20c and one non-latched address buffer 22. The address buffers are responsible for managing addresses that must pass between the motherboard and the expansion buses. Under the control of the bus controller chip 12, the address buffers drive 68030 addresses onto the bus when the motherboard acts as MASTER. The address buffers drive the appropriate bus addresses onto the motherboard when the motherboard acts as SLAVE to a bus master. The controller determines when various bus to bus connections are made, and when address latching is required. Additionally, the address buffers 20a, 20b, 20c aid to increase the processing speed of the arbitration system. The PAL device 14 is also located in the address sector 16 and is responsible for determining the type of cycle that is run after a device has been granted the bus. All three-wire/16 bit devices obey the 16 bit synchronous protocol, but any 32 bit/two-wire device, or the 32 bit host processor, can run either 16 or 32 bit cycles, depending on the need. The cycle type is determined by bus address, thus the decoding PAL.

The data sector 18 includes two latching data buffers 24a, 24b and three non-latching data buffers 26a, 26b, 26c including a non-latching bi-directional data buffer 26d. The data buffers act under control of the bus controller 12 to make the proper data connections between motherboard and expansion data buses when the two transact. When the motherboard acts as MASTER, either 16 or 32 bits must be transferred between motherboard and expansion bus with read latching in the 16 bit case. When the motherboard acts as SLAVE, a 32 bit connection is made for a new style bus master, and a 16 bit connection with 16 or 32 bit word bridging for an old style bus master.

The two-wire expansion bus is based on a 100 pin single piece connector. The bus is divided into three distinct mapping regions, three-wire bus arbitration protocol memory space, three-wire bus arbitration protocol I/O space and two-wire bus arbitration protocol space. The three-wire bus arbitration protocol space is limited to a 16 Mbyte region and is in original Motorola-style 68000 memory mapping for any bus implementation. The two-wire bus arbitration space can be physically anywhere in the 32 bit memory.

The two-wire expansion bus functions in one of two different major modes depending upon the memory address present on the bus. All bus cycles start with a 32 bit address. If the memory address is determined to be in three-wire bus arbitration protocol space, i.e., an expansion device accessing the bus having a 24 bit address, a three-wire bus arbitration protocol compatible cycle is initiated by the bus master and all responding slave devices are expected to be three-wire bus arbitration protocol compatible. If a two-wire bus arbitration protocol address is detected, i.e., a 32 bit address device is accessing the bus, the cycle completes when the two-wire expansion bus slave device responds to an instruction sent by the main controller or when the bus times out.

It is important that no two-wire expansion bus device respond in a two-wire bus transaction protocol mode on a three-wire expansion bus since the bus transactions of two-wire expansion bus devices and three-wire expansion bus devices require different bus protocols. In a typical bus transaction, a bus master generates bus addresses, strobes and writes data. A bus slave responds to the bus address and generates read data. The type of slave responding to a cycle is always the same as the type of bus master.

Referring to FIG. 2, there is shown a schematic logic diagram for a cycle/select circuit 27 for determining what type of device is currently accessing the bus, and what cycles the particular device is running. Various inputs 28 can be received from the controller chip 12 which identify the type of cycle being run. An signal received at a MEMZ2 input 30 indicates that a three-wire bus arbitration protocol (old style) memory cycle is being run by an old style device. An signal received at a IOZ2 input 32 indicates that an old style I/O cycle is being run by an old style device. If neither the MEMZ2 input 30 or the IOZ2 input 32 is receiving a signal, then a signal is outputted from the NOZ2 output 34 indicating that no old style cycles are being run on the bus. This is significant, because unlike new cycle devices which access the bus for a predetermined number of cycles, an old style device remains on the bus until it relinquishes it. If a signal is received at either the MEMZ2 input 30 or the IOZ2 input 32, a signal is outputted at the SPACEZ2 output 36 indicating that old style memory space is being used.

When an old style device is accessing the bus, an old style compatibility cycle strobe (CCS) is also asserted to the CCS input 38. The CCS strobe indicates to the bus that an old style device is currently acting as the bus master. The CCS input 38 causes a signal to be outputted at the BIGZ output 40. The BIGZ signal indicates to the motherboard that a 16 bit (old style) device is in charge of the bus and causes the local bus controller to supply high order 8 address bits of the full 32 bit address to the bus. The high order address bits act as dummy bits which cause the old style signal to be in the form of a typical 32 bit device signal, i.e., a 24 bit signal. The remaining 24 address bits are supplied by the old style bus master.

A signal is asserted to the ADDRZ3 input 42 when any two-wire bus arbitration protocol device (new style) is currently accessing the bus. In addition, a full cycle strobe must be asserted for any new style device to access the bus which is asserted to the FCS input 43.

A signal is outputted at the SPACEZ3 output 44 in response to the ADDRZ3 input 42 indicating that new style memory space is being accessed.

A signal asserted to the COP input 46 indicates a motherboard processor interrupt or coprocessor service condition. The COP input 46 is a decode based on MS0, MS1, MS2 and the bus mastership state of the system. The COP input 46 can carry a memory code to the interrupt space decode at the QINTZ3 output 48. The existence of an asserted COP decode input will inhibit any generation of old style cycles. The COP decode input will also inhibit the new style cycle which is indicated by an output at SPACEZ3 output 44 instead of generating an interrupt response cycle at the QINTZ3 output 48.

A signal asserted to the MS1 input 52 indicates what type of cycle is being run as recognized by the host. The information received at the MS1 input 52 is outputted at the DATAIO output 50.

Figure 3:
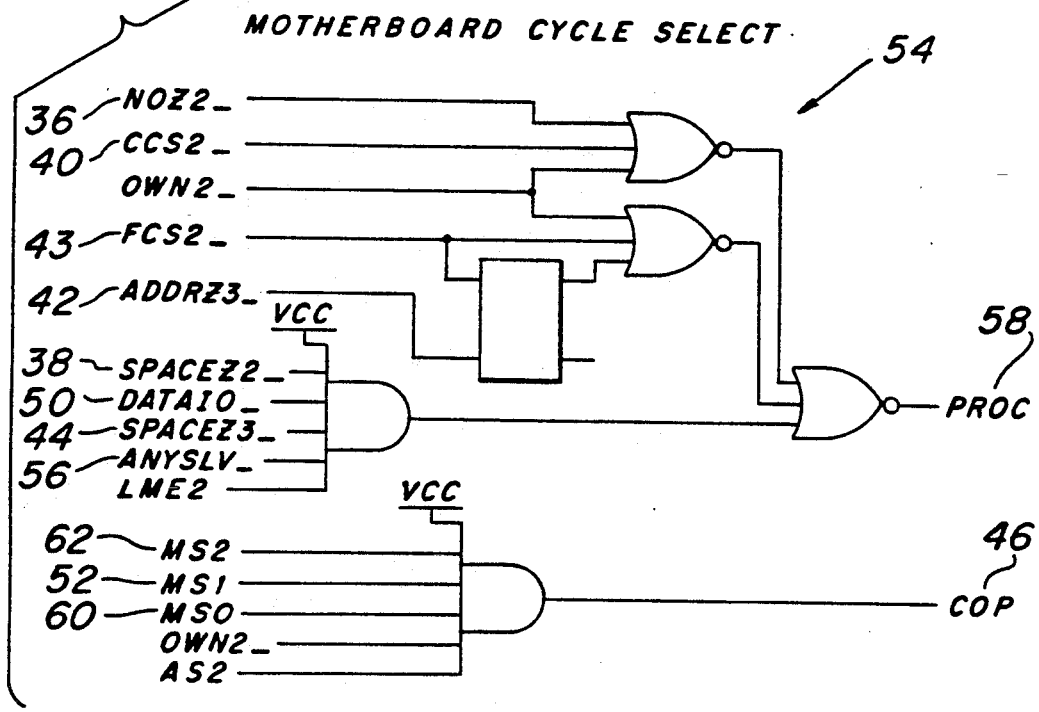
FIG. 3 is a schematic of a motherboard cycle select circuit of the bus arbitration system of FIG. 1.

Referring to FIG. 3, there is shown a schematic logic diagram for a motherboard cycle select circuit 54 for determining whether the motherboard is requesting access to the bus. Typically, the motherboard (not shown) becomes the bus master as a result of a default condition, i.e., when no other device is requesting access to the bus at that time. The motherboard is usually assigned the lowest priority for receiving access to the bus.

A number of signals are internally generated based on signals inputted to the controller chip 12 at various inputs and including the SPACEZ2 input 38, the DATAIO input 50, the SPACEZ3 input 44 and an ANYSLV input 56 which logically ORs the signals together to determine which devices are requesting or responding to the bus. If no device is currently requesting or responding to the bus, a signal is outputted at the PROC output 58 indicating to the controller chip that the motherboard should be given access to the bus.

At the same time, a number of signals are received at the MS0 input 60, the MS1 input 52 and the MS2 input 62 which are logically ANDed together to indicate cycle subtype, data, memory or an interrupt. A signal outputted at the PROC output 58 indicates an access to a motherboard SLAVE or an equivalent resource. An I/O signal at the OWN input indicates a motherboard default MASTER when the signal is negated and an expansion MASTER when the signal is asserted. If no device is currently accessing the bus, a signal is outputted at the COP output 46 indicating a default condition and acts to request access to the bus for the motherboard.

Figure 4:
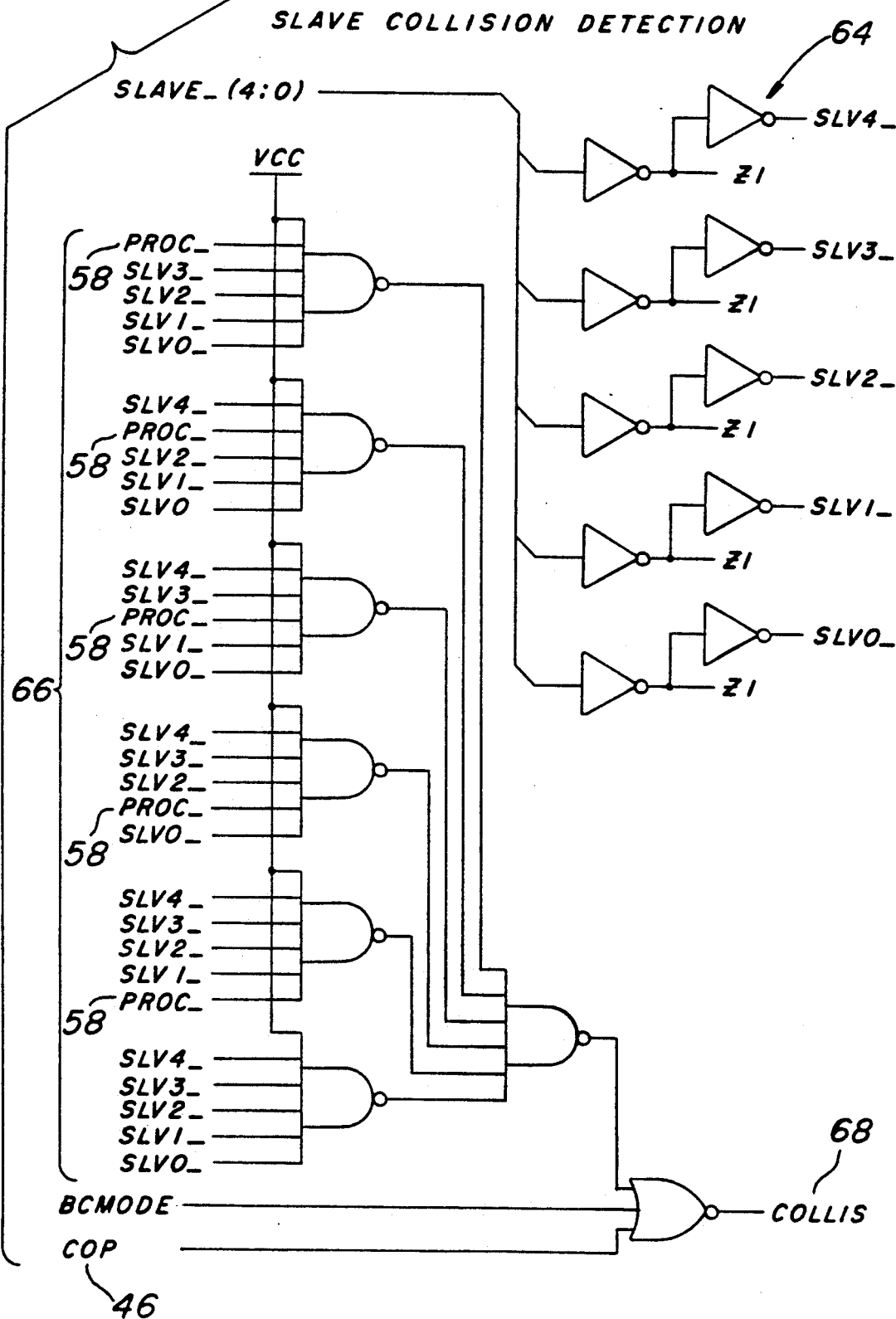
FIG. 4 is a schematic of a slave collision detection circuit of the bus arbitration system of FIG. 1.

Referring to FIG. 4, there is shown a schematic logic diagram for a bus contention detection circuit 64. Bus contention occurs when more than one device tries to access the bus at the same time. The bus contention detection circuit 64 monitors the bus and detects the presence of any slave device (not shown) currently accessing the bus at a particular point in time. A slave device can either be a new style device or an old style device. Each device has its own slave output. When any expansion bus device responds to an address on the bus, it must assert a slave signal 66. If the motherboard is responding to a bus address, the PROC signal 58 is asserted to the bus contention detection circuit 64. If more than one slave signal 66 occurs for the same address, or if a device asserts its slave output for an address reserve by the local bus, a collision is registered and the bus asserts a bus error signal which is outputted at the COLLIS output 68. The asserted slave signal 66 will cause the bus addresses to latch onto the falling edge of the full cycle strobe (FCS). The FCS strobe is only driven for valid bus addresses. The full cycle strobe defines whether or not a cycle is currently running on the bus. Only one slave signal 66 may respond to any given bus address in order to avoid bus contention. If a bus contention condition is detected by the bus controller, the bus controller must determine whether it is a motherboard condition error or an expansion bus condition error.

Figure 5:
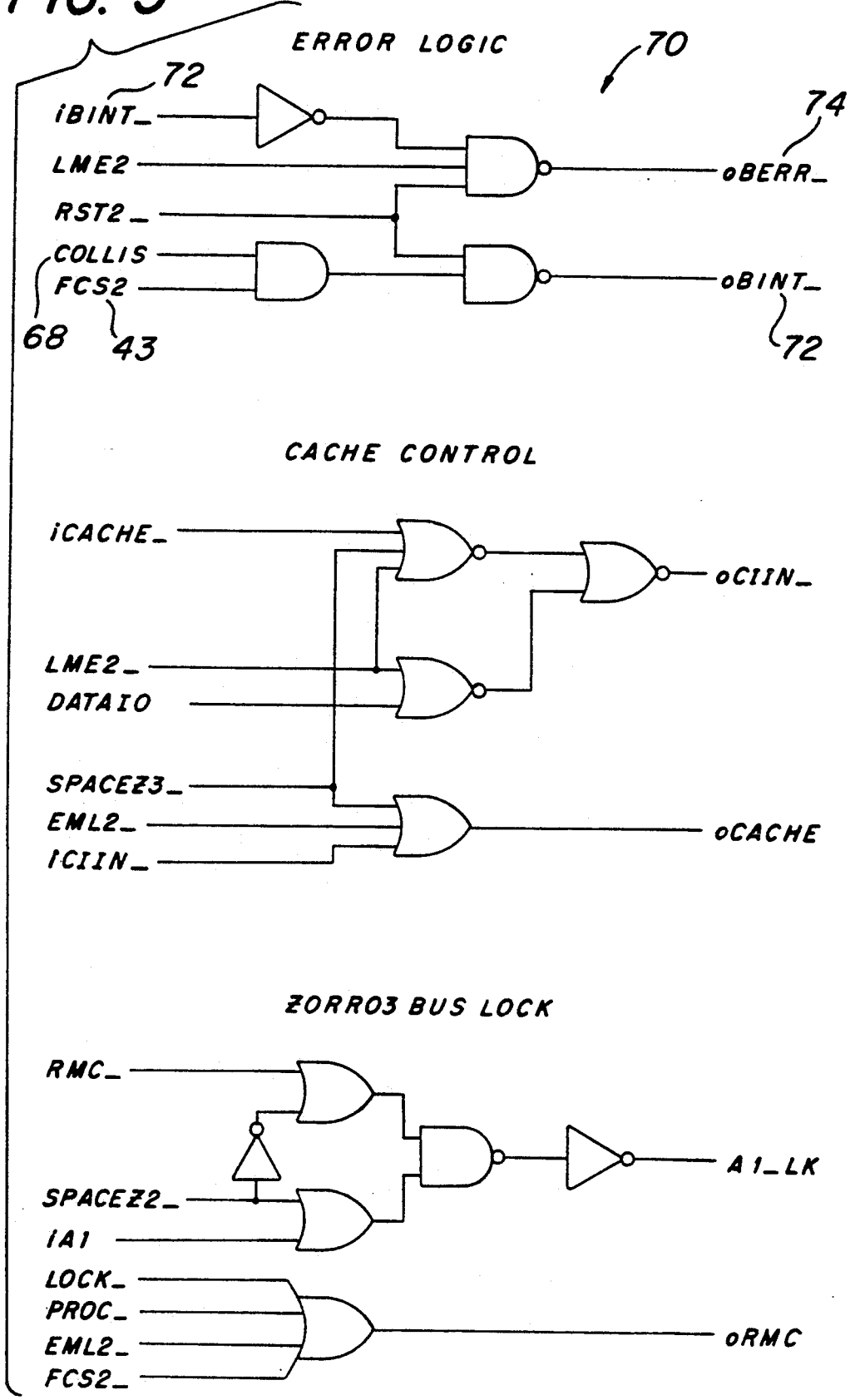
FIG. 5 is a schematic of an error logic circuit of the bus arbitration system of FIG. 1.

Referring to FIG. 5, there is shown a schematic logic diagram for an error logic circuit 70 for determining the type of error condition present. The error logic circuit 70 receives a signal at its FCS input 43 indicating what type of cycle is currently be run on the bus. If a slave collision is detected, a signal to the COLLIS input 68 is also asserted. Otherwise, the particular type of error which is present on the bus, such as an expansion bus error, a signal is asserted to the BINT input 72 and received by the circuit. If a signal is outputted at the BERR output 74, the bus controller is informed about a motherboard error condition. If a signal is outputted at the BINT output 72, the bus controller is informed about a bus expansion condition error.

Once the type of device which is accessing the bus is determined and no error conditions are detected, the bus controller must determine the direction which information is flowing across the bus.

Figure 6:
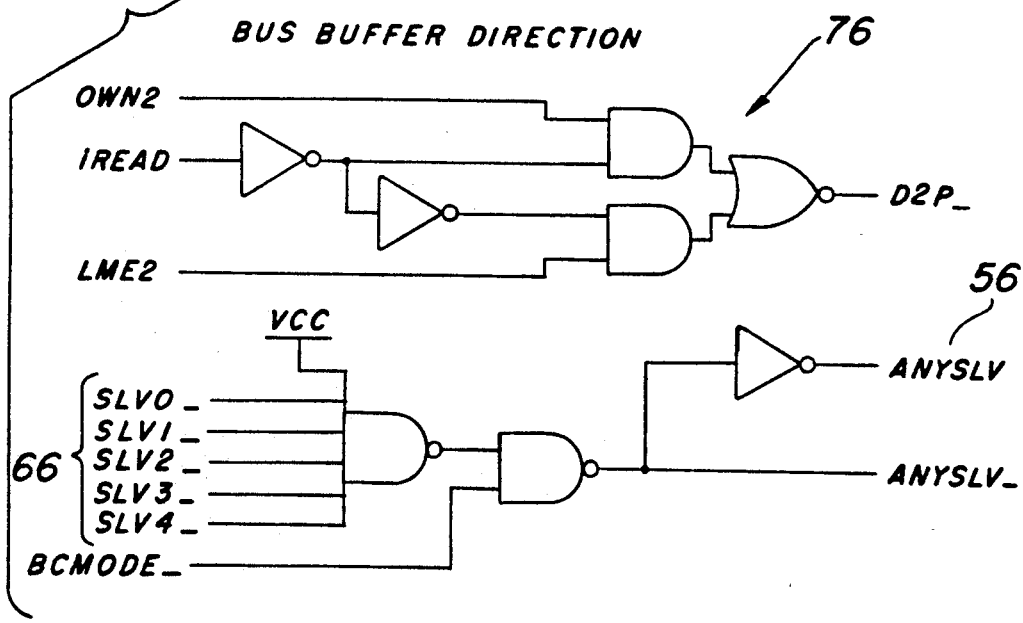
FIG. 6 is a schematic of a bus buffer direction circuit of the bus arbitration system of FIG. 1.

Referring to FIG. 6, there is shown a schematic logic diagram for a bus buffer direction circuit 76 for determining the direction in which data can be transmitted through the bus buffers. The bus buffer circuit receives a signal from the device currently accessing the bus is received at one of the SLV inputs 66. The current bus master transmits address bits for each cycle. The OWN signal determines whether the MASTER is a bus device or the motherboard. The circuit 76 determines the data flow either from MASTER to SLAVE or from SLAVE to MASTER. Accordingly, the bus controller directs the bus so that the address bits or data bits are flowing in the correct direction so that they are received by the intended recipient.

Figure 7:
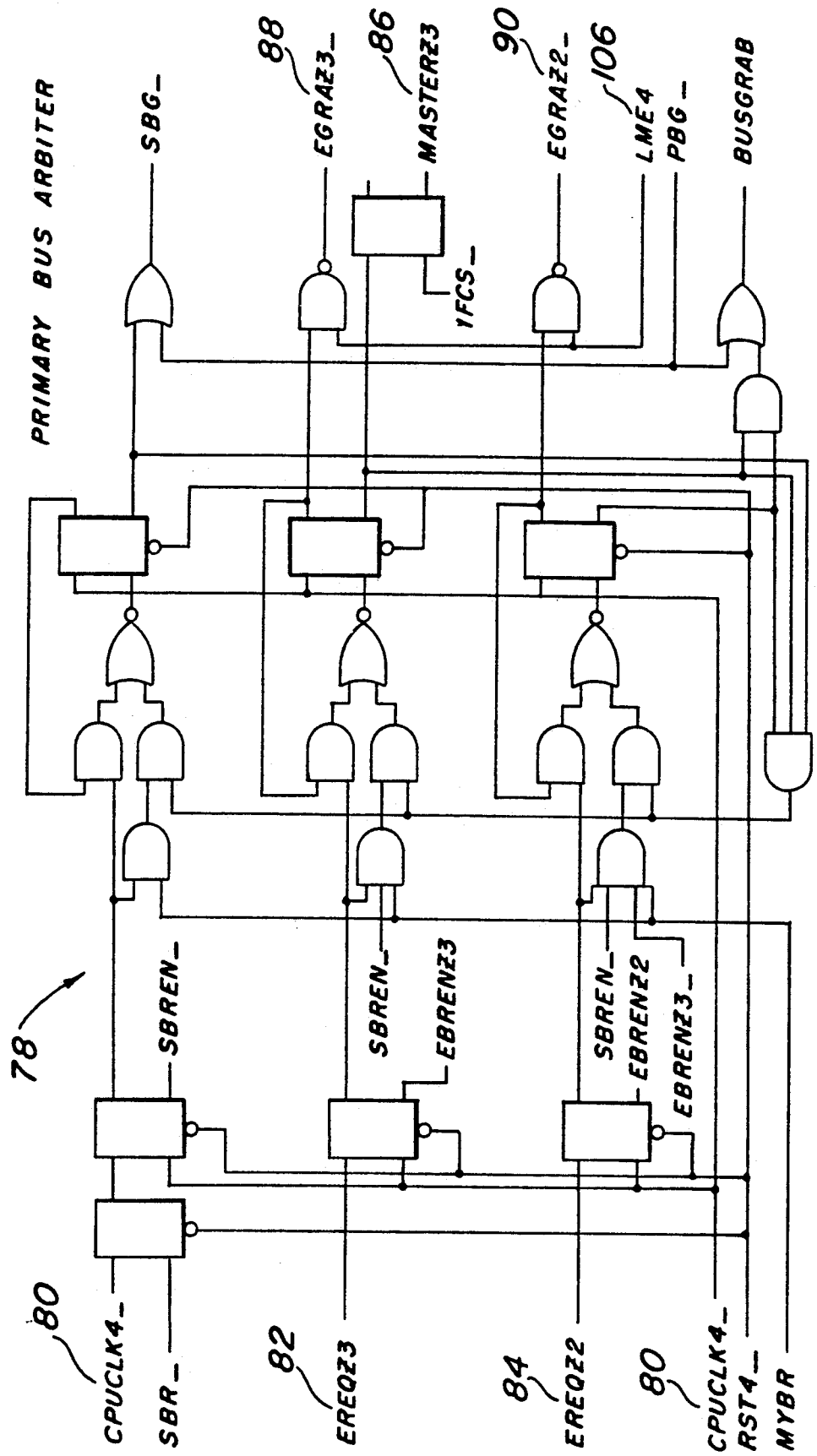
FIG. 7 is a schematic of a primary bus arbiter of the bus arbitration system of FIG. 1.

Referring to FIG. 7, there is shown a schematic logic diagram for a primary bus arbiter 78 which prioritizes the devices which are currently requesting access to the bus. The primary bus arbiter 78 encodes two types of bus requests. The first is a fixed priority request in which certain devices have higher priority over other devices. In this system, the three-wire expansion buses are assigned the lowest priority and the two-wire expansion buses are assigned the highest priority. The bus controller determines which device is assigned the highest priority. When devices of equal priority request the bus, round robin scheduling is used which is based on a fairness mechanism to be discussed hereinafter. In the case of two-wire expansion bus devices, the controller determines the amount of cycles in which the selected device can remain on the bus. In the case of three-wire expansion bus devices, the selected device maintains control of the bus until the device relinquishes the bus.

The primary bus arbiter 78 receives requests from all devices which seek access to the bus. A CPUCLK is used to sequence the arbitration logic. A signal asserted to the EREQZ3 input 82 indicates that a 32 bit device (new style) is requesting direct memory access of the bus. A signal asserted to the EREQZ2 input 84 indicates that a 16 bit device (old style) is requesting direct memory access of the bus. The primary bus arbiter 78 receives the requests from the various devices and prioritizes the devices such that one particular device is given the highest priority and is designated as the next device to be given access to the bus. A signal outputted at the MASTERZ3 output 86 indicates the device which has been given the highest priority and which will be the next bus master accessing the bus. A signal outputted at the EGRAZ3 output 88 indicates that a 32 bit device which is requesting access to the bus has won the bus. A signal outputted at the EGRAZ2 output 90 indicates that a 16 bit device which is requesting access to the bus has won the bus. The actual device which wins the bus is handled in the appropriate secondary arbitration logic.

Figure 8:
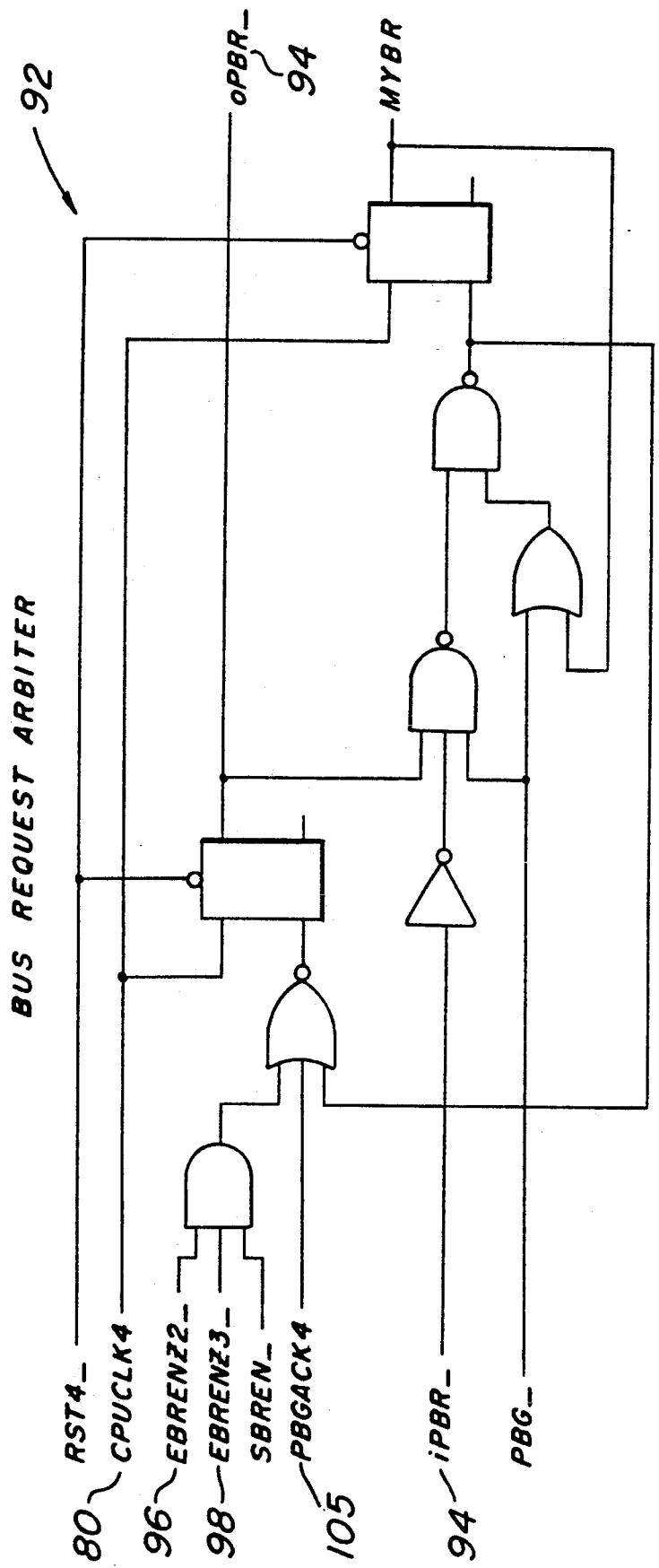
FIG. 8 is a schematic of a bus request arbiter of the bus arbitration system of FIG. 1.

Referring to FIG. 8, there is shown a schematic logic diagram depicting a bus request arbiter 92. The bus request arbiter 92 is activated when special conditions exist in the system, such as when an external device requests access to the bus. A request from an external device to access the bus is received at the PBR input 94. The PBR arbitration is used to determine the motherboard bus master. External devices can be any devices which are compatible with the bus such as a 68040 processor or other high speed devices which request the bus. The bus request arbiter monitors a particular clock edge at which the external device can assert its bus request. Before an external device is granted access to the bus, the bus controller must make sure that no other devices are currently accessing the bus. All bus requests from the external devices must compete with other devices requesting access to the bus.

When an external device wishes to access the bus, the external device asserts a bus request signal at the PBR input 94 of the bus request arbiter 92. As well as receiving bus request signals from external devices, the bus request arbiter 92 receives bus request signals from old style devices at a EBREN2 input 96 and new style devices at a EBREN3 input 98. If a 68030 type device is currently accessing the bus, a bus grant acknowledge signal is received at the PBGACK input 100 of the bus request arbiter 92 to signal to the arbiter 92 that a device is currently accessing the bus.

The bus request arbiter 92 also monitors the CPU clock at its CPUCLK input 80 to detect a particular clock edge. When the particular clock edge is detected by the bus request arbiter, the external device bus request signal can be outputted at the PBR output 94 to the bus controller for further processing. Other devices currently requesting the bus receive bus grant holds until all internal logic required for allowing the external device to access the bus is completed.

Figure 9:
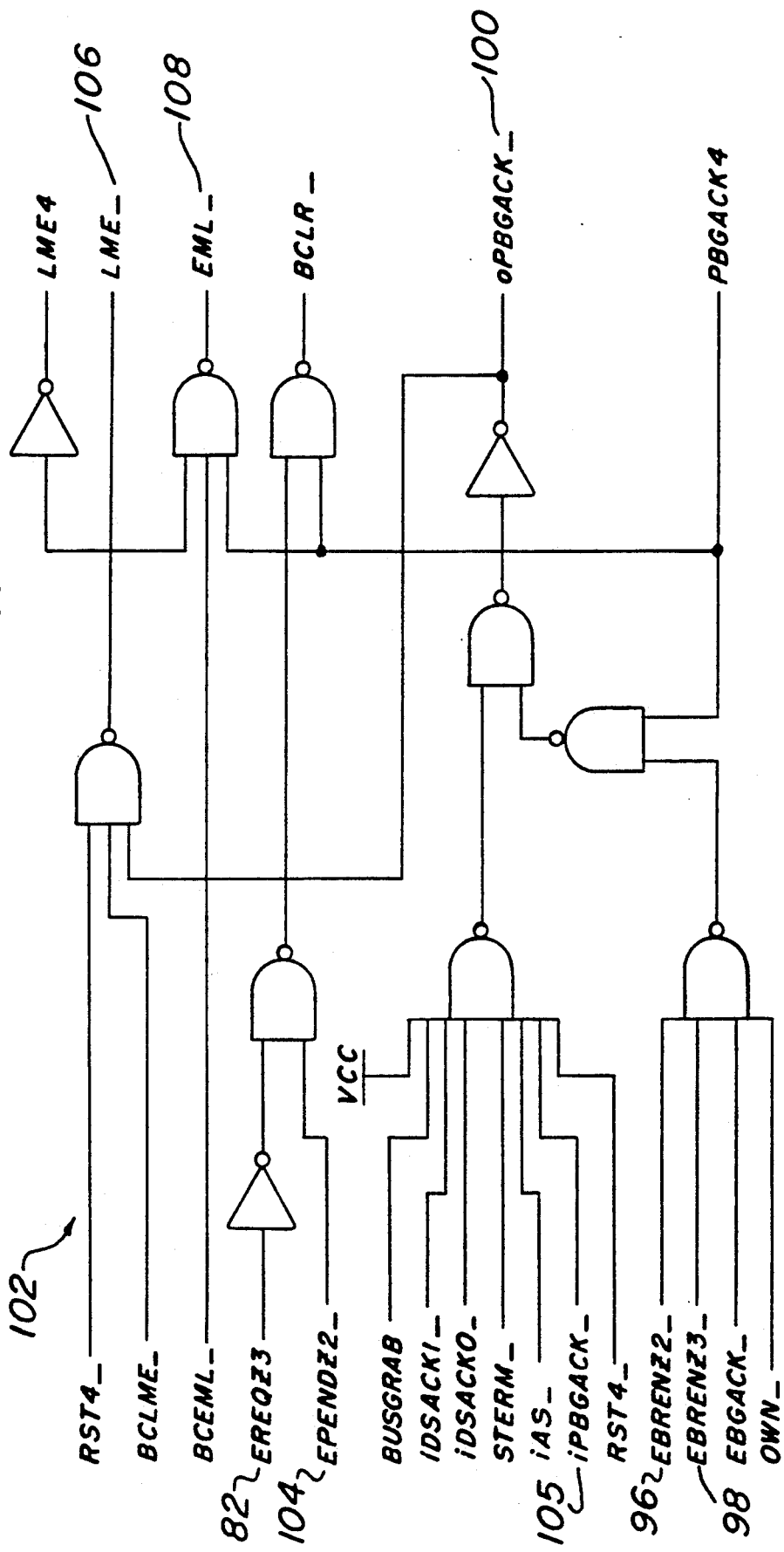
FIG. 9 is a schematic of a local bus grant acknowledge circuit of the bus arbitration system of FIG. 1.

Referring to FIG. 9, there is shown a schematic logic diagram depicting a local bus grant acknowledge circuit 102. A bus grant acknowledge signal is the mechanism for accessing the bus based on the type of grant received by the bus controller. The bus arbiter 78 observes all incoming bus requests and acts as the mechanism which actually attains access of the bus. New style bus request signals are received at the EBRENZ3 input 98 and old style bus requests are received at the EBRENZ2 input 96 of the local bus grant acknowledge circuit 102. If a device is already accessing the bus, the local bus grant acknowledge circuit 102 will receive a signal at its PBGACK input 100 indicating that the device has already received a bus grant acknowledge signal. Devices which have received a grant pending signal continue to assert a bus request signal at the EPENDZ2 input 104 of the bus grant acknowledge circuit 102. Once the local grant acknowledge circuit 102 has acknowledge a grant signal from a particular device, the circuit device asserts a signal at the PBGACK output 100 of the local bus grant acknowledge circuit 102 to indicate to the motherboard bus controller, which in this case is a Motorola 68030 device, that a device is currently accessing the bus. In addition, a signal is sent to the local bus at the LME output 106 or the expansion bus at the EML output 108. To form the expansion bus as to which device is currently being granted access to the bus. A signal asserted from the local bus grant acknowledge circuit 102 at the IME output 106 indicates that the local bus has mastered the expansion bus and a signal asserted at the EML output 108 indicates that the expansion bus has mastered the local bus.

In general, old style devices follow three-wire bus arbitration protocol. An old style device requires a bus request strobe, a bus grant strobe and a bus grant acknowledge strobe. An old style slave device requesting access to the bus controller asserts a bus request strobe until a bus grant strobe has been received from the bus controller. Once a bus grant strobe is received, the requesting old style slave device is allowed access to the bus once the previously selected slave device has relinquished the bus. Once the newly selected old style slave device has received the bus grant signal, the selected old style slave device asserts a bus acknowledgment strobe back to the bus controller.

Figure 10:
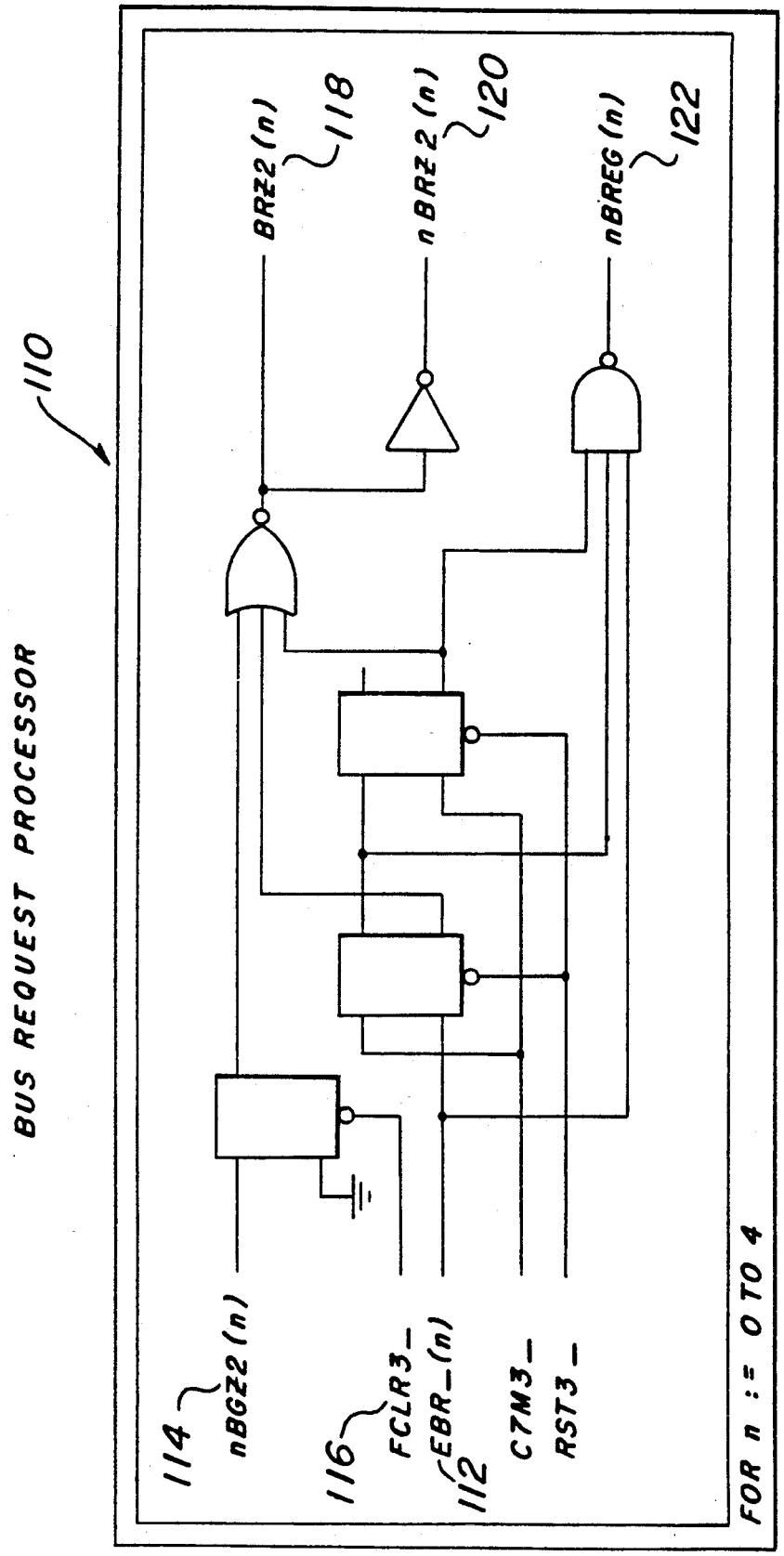
FIG. 10 is a schematic of a bus request processor of the bus arbitration system of FIG. 1.

Referring to FIGS. 10-13, there are shown schematic logic diagrams depicting the arbitration system implemented to grant old style devices (16 bit device) access to the bus. Referring specially to FIG. 10, there is shown a schematic logic diagram for a bus request processor 110. The bus request processor 110 receives all incoming bus requests from both new and old style devices at its EBR input 112. The bus request processor 110 filters out the new style devices from the old style devices and determines whether a bus request should be given to a particular old style device. The bus request processor 110 also receives bus grant signals asserted by the old style bus grant processor 128 at the BGZ2 input 114 which informs the bus request processor 110 if a device is currently accessing the bus. In the event of a reset condition, or when all requests have been serviced, a signal is received at the FCLR3 input 116 which acts to clear the bus request latch such that the bus request processor 110 is reinitialized, i.e., has not assigned priority to any device as is essentially the output from the old style fairness mechanism. The bus request processor 110 determines whether a device is an old style device or a new style device by monitoring the request signal for two clock cycles. Since new style devices assert a bus request signal in the form of pulses, the request signal usually does not exceed two clock cycles. If the request signal remains in a low state, it indicates to the bus request processor 110 that the bus request is being asserted by an old style device. Selected old style bus request signals are outputted at the BRZ2 output 118. Old style bus request signals which are not selected are outputted at the nBRZ2 output 120 and new style bus request signals are simply passed through the bus request processor at its NBREG output 122.

Figure 11:
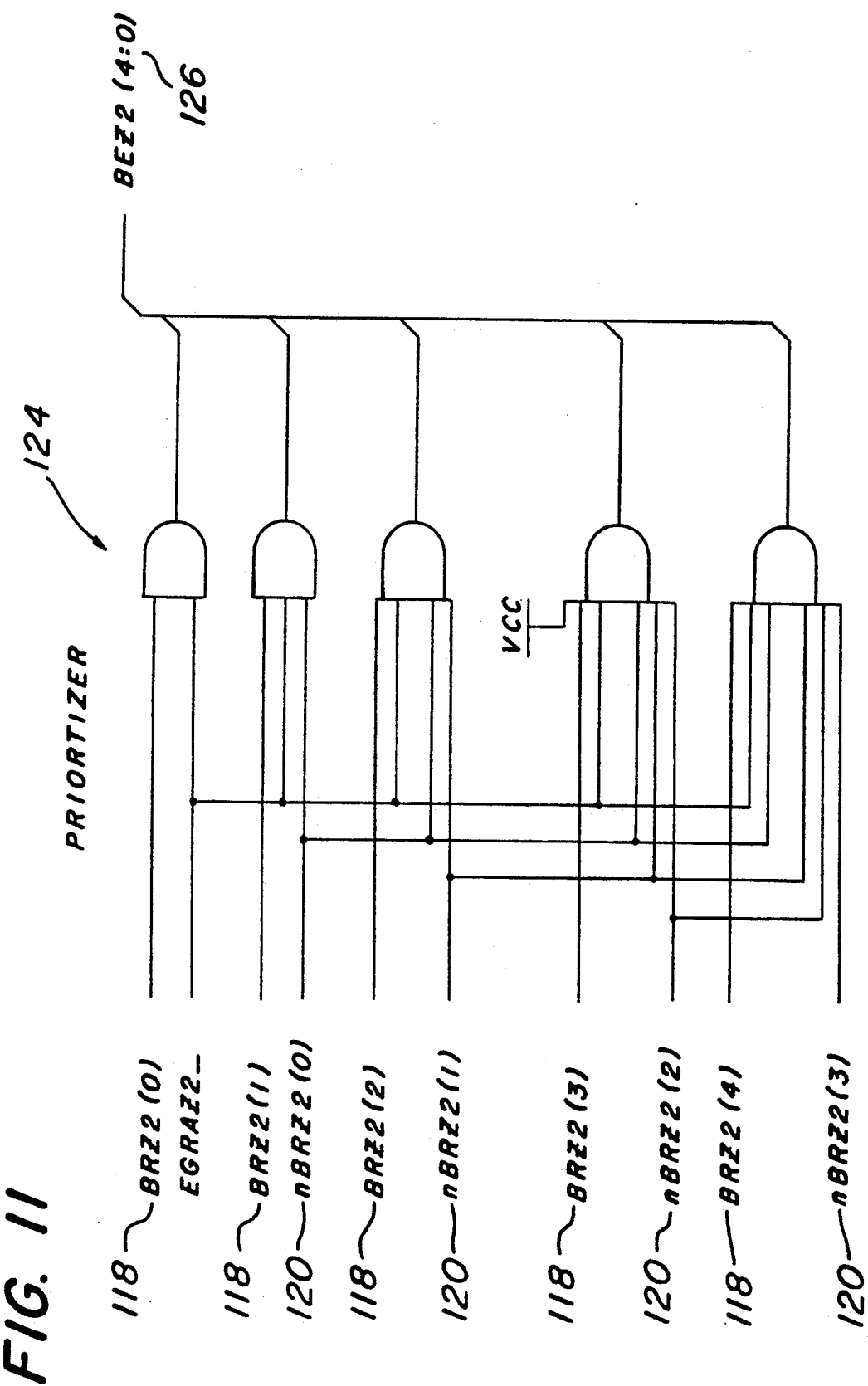
FIG. 11 is a schematic of a prioritizer of the bus arbitration system of FIG. 1.

Referring to FIG. 11, there is shown a schematic logic diagram for an old style device prioritizer 124. The prioritizer receives inputs from all old style devices requesting access to the bus. Selected bus request signals are received at the BRZ2 input 118 and all other old style bus request signals are inputted at the nBRZ2 inputs 120. The old style bus request signals are sent through a series of comparators to determine the order of priority of the various bus request signals. The bus request signals are outputted in priority order at the BEZ2 output 126, whereby the first signal outputted is assigned the highest priority and the last signal outputted is assigned the lowest priority.

Figure 12:
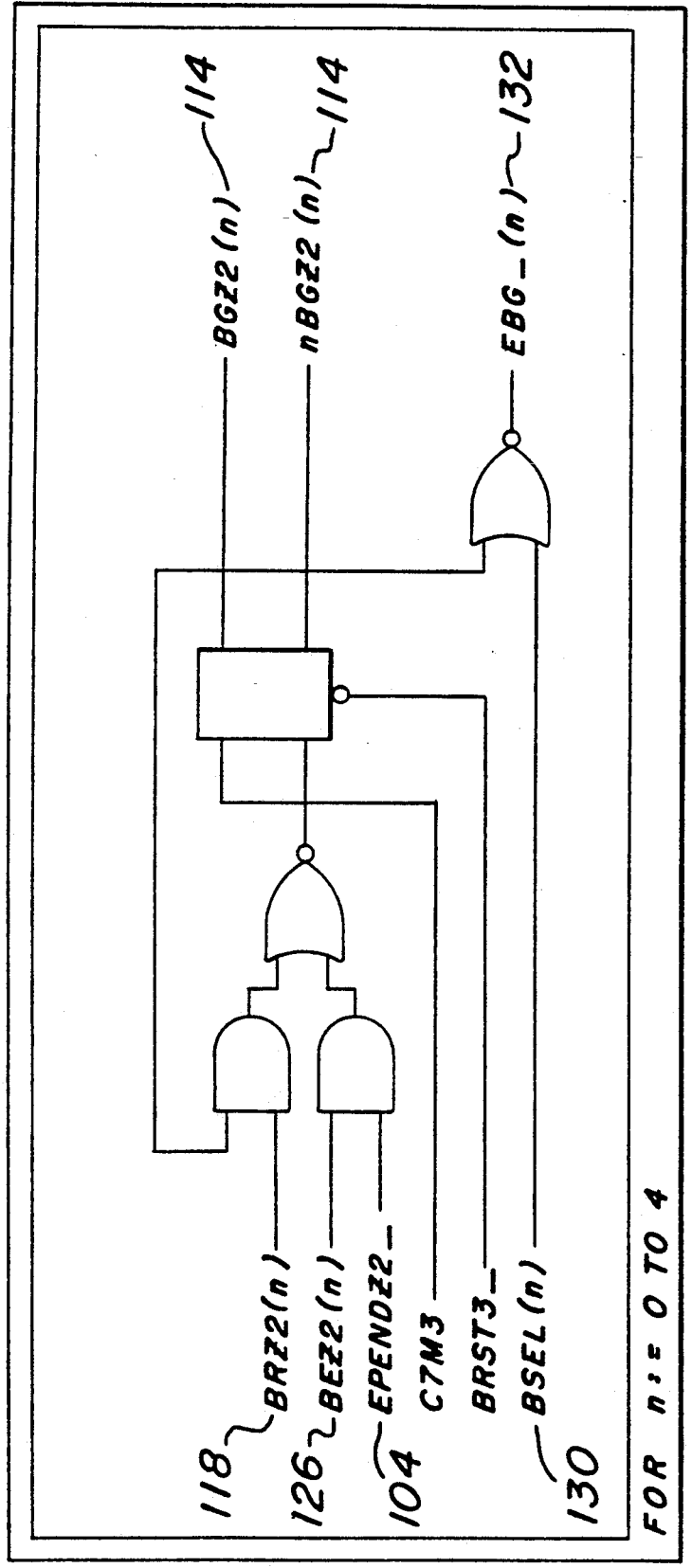
FIG. 12 is a schematic of a bus grant latch of the bus arbitration system of FIG. 1.

Referring to FIG. 12, there a schematic logic diagram of a bus grant latch 128. The bus grant latch 128 physically latches outgoing grant signals which are sent from the bus in response to bus request signals from various devices requesting access to the bus. The bus grant latch 128 receives the bus request signal from the highest priority old style device at its BEZ2 input 126. All other bus request signals are inputted to the bus grant latch 128 at the BRZ2 input 118. If a new style device is currently accessing the bus, a signal is inputted at the BSEL input 130 of the bus grant latch 128 to indicate that the bus is sending a grant signal to a 32 bit device. If an old style device is currently accessing the bus, a signal is asserted at the EPENDZ2 input 104 to indicate that a grant signal is being transmitted to an old style device. Since old style devices follow Motorola-style 68000 convention, the selected device retains access of the bus until the selected device decides to relinquish the bus. The old style device cannot be removed by a higher priority bus master device while the old style device has access to the bus.

Once the bus grant latch 128 determines that the bus is no longer being accessed by a device, the bus grant latch 128 outputs a bus grant signal at its BGZ2 output 114 to the device selected to next have access to the bus, and in turn, at the EBG output 132 of the bus grant latch.

Figure 13:
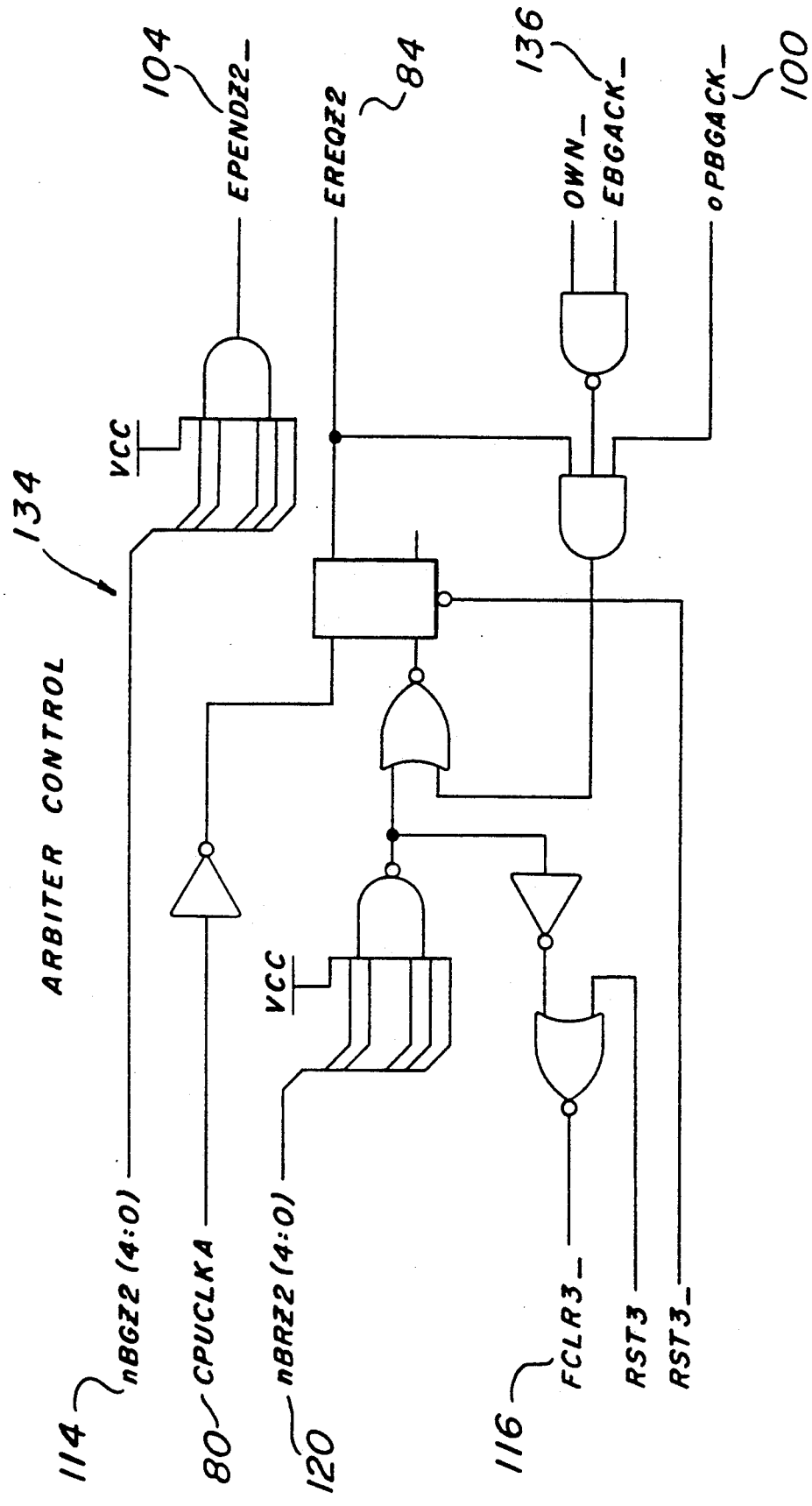
FIG. 13 is a schematic of an arbiter control circuit of the bus arbitration system of FIG. 1.
Figure 15:
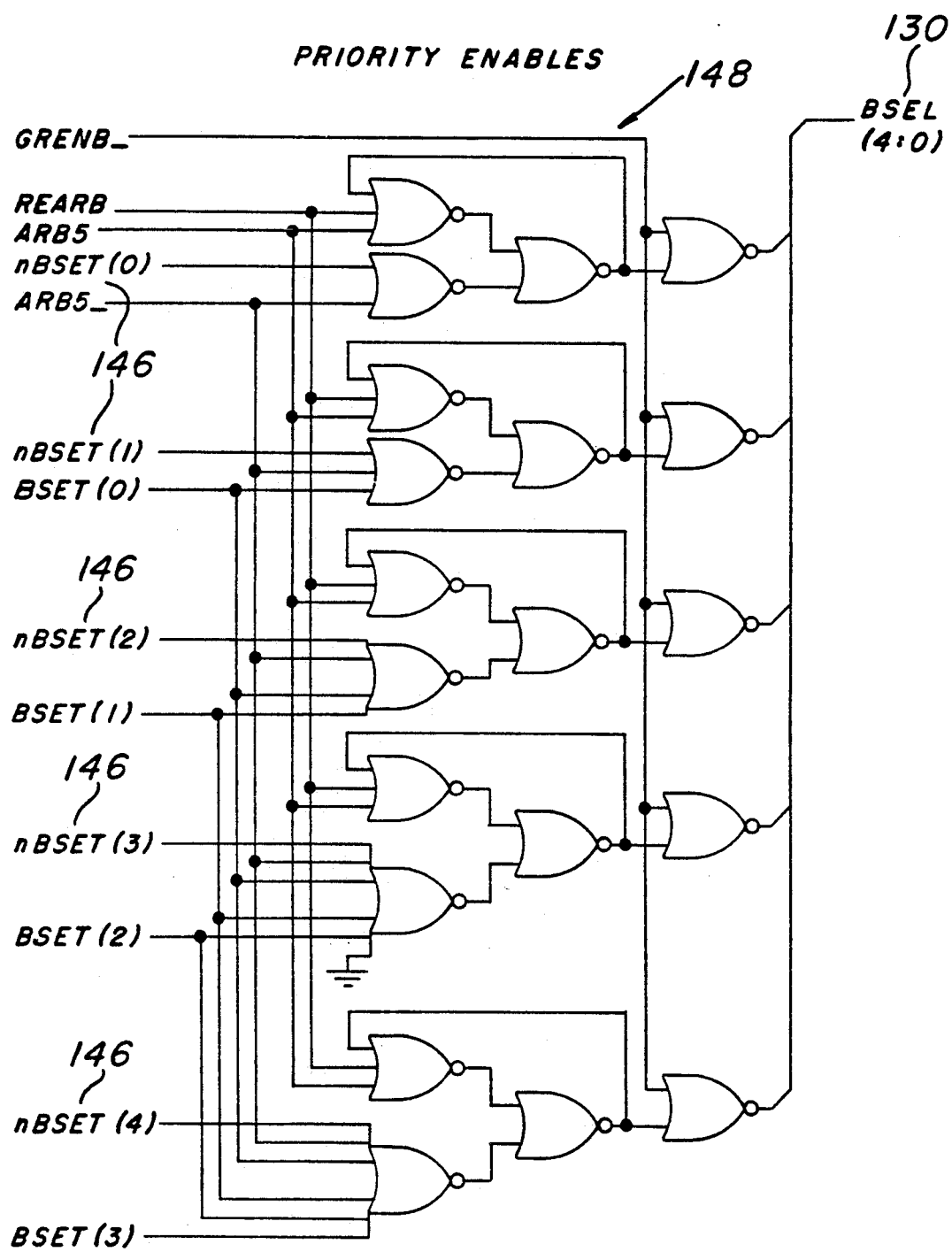
FIG. 15 is a schematic of a priority enable circuit of the bus arbitration system of FIG. 1.

Referring to FIG. 13, there is shown a schematic logic diagram of an arbiter control 134 for determining the current status of the bus. The arbiter control 134 looks at all incoming bus requests from various devices at its nBRZ2 input 120 and all grant signals being transmitted from the bus to various devices at its BGZ2 input 114. If no requests are currently incoming to the arbiter 134, a clear signal is asserted at the FCLR input 116 of the arbiter control 134 which essentially clears out the arbiter control 134. At this point a new arbitration cycle can be initiated.

If a device is currently accessing the bus, a signal is inputted at the EBGACK input 136 and the OWN input of the arbiter control 134 which applies only to old style devices. The EBGACK and OWN signals indicate that a master of some kind currently owns the bus. This serves to latch the state of EREQZ2 if the current master was an old style device, since the nBRZ2 inputs will negate shortly after that MASTER takes the bus. The PBGACK signal indicates that the local bus has not yet been taken over. If a device is currently accessing the bus and is a 68030 type device, a signal is outputted at the PBGACK output 100 of the arbiter control 134. All pending bus grant signals are outputted at the EPENDZ2 output 104 of the arbiter control 134. Likewise, all pending bus request signals are outputted at the EREQZ2 output 84 of the arbiter control 134. The arbiter control 134 is responsible for controlling access of the devices onto the bus in order to prevent bus contention and to be able to monitor the current status of various devices with respect to gaining access to the bus.

In general, a new style device follows two-wire arbitration protocol. A two-wire expansion bus comprises a first wire which carries a bus request strobe and a second wire which carries a bus grant strobe. The request strobe is asserted by a device to request access from the central bus controller for a predetermined number of bus cycles. The request signal is transmitted in the form of one or more coded pulses on the request line. The request signal informs the bus request processor 110 of the nature and/or priority of the request. The priority encoder 148 asserts a bus grant strobe to the new style device having the highest priority, thus allowing the selected slave device to access the bus.

Figure 14:
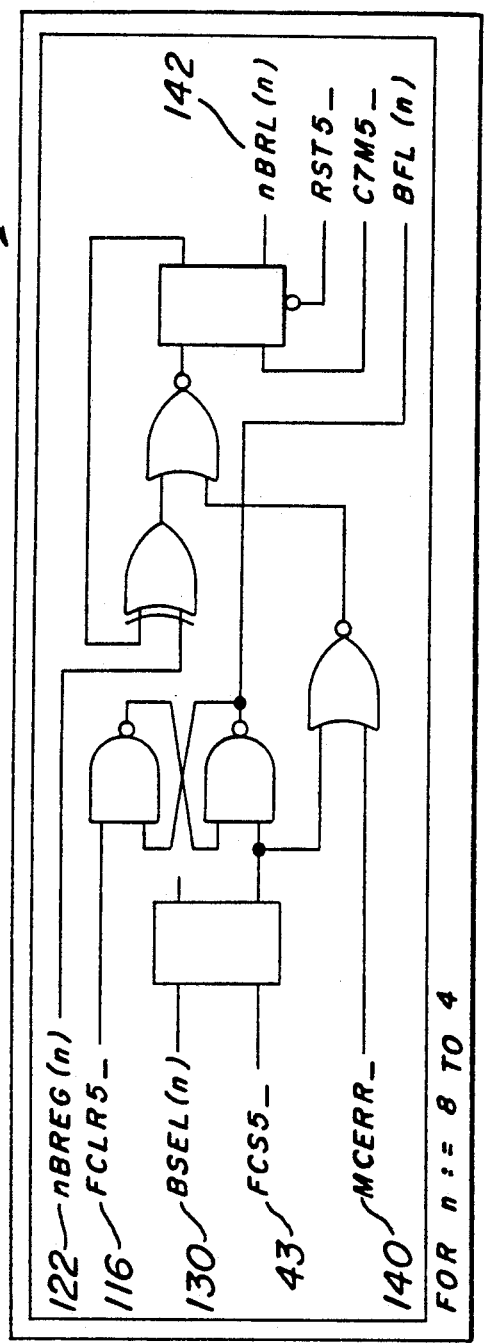
FIG. 14 is a schematic of a registry latch of the bus arbitration system of FIG. 1.

Referring to FIGS. 14–21, there is shown the arbitration and DMA support logic required for a new style device to obtain access to the bus. Referring specifically to FIG. 14, there is shown a schematic logic diagram of a registry latch 138. The registry latch 138 receives all new style bus request signals at its nBREG input 122. If a new style device is currently accessing the bus, an input is received at the BSEL input 130 of the registry latch 138. A full cycle strobe is asserted at the FCS input 43 which indicates that valid bus addresses are being driven on the bus. As discussed above, the full cycle strobe defines whether or not a cycle is currently running on the bus. The full cycle strobe also determines which type of cycle is to be run. The negation of the full cycle strobe at the FCS input 43 and the input from the selected device at the BSEL input 130 indicates to the registry latch 138 that no device is currently accessing the bus. A signal received at the MCERR input 140 indicates that a grant signal has been transmitted from the bus controller to a particular device, but that the selected device has not started running cycles within a certain amount of time. The presence of the MCERR signal causes the registry latch 138 of the device currently granted the bus to be set to the unregistered state. This will cause a re-arbitration of the bus, and the next master, if any, will get a chance at the bus. Once the bus is determined to be in an unaccessed state, the registry latch 138 asserts a nBRL output 142 for each device which is requesting access to the bus.

The registry latch 138 and the bus run under a fairness logic mechanism which denies access to the bus to any master device which has previously had access to the bus until all other requesting master devices have gained access to the bus. If a new style device is requesting access onto the bus, the bus first determines if the device has previously requested and received access to the bus. All bus requests are received by a priority encoder which singles out the device having the highest priority.

Figure 16:
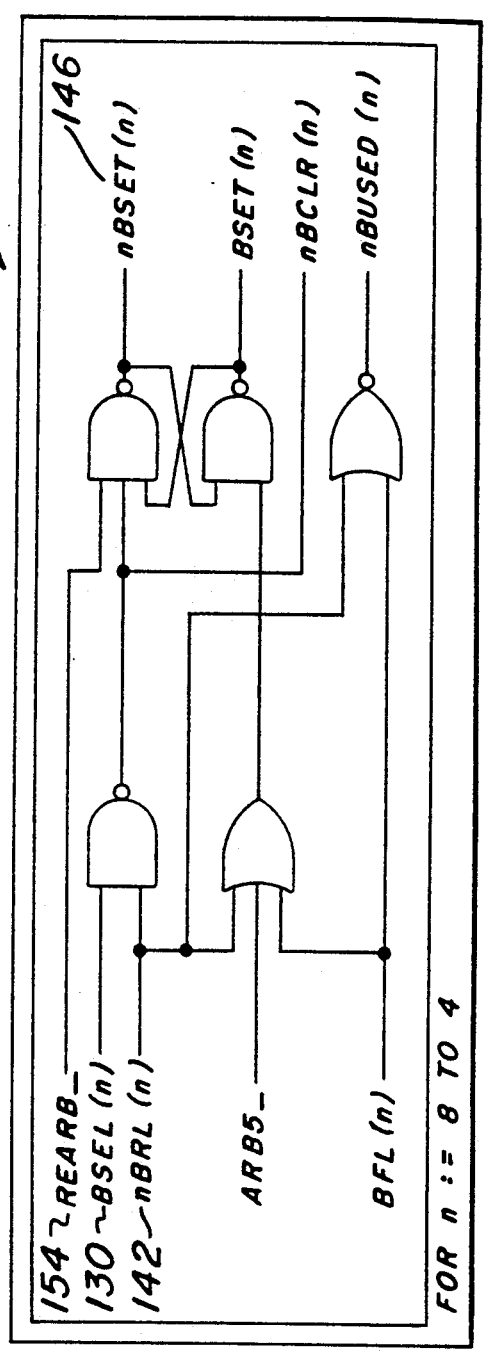
FIG. 16 is a schematic of a prearb latch of the bus arbitration system of FIG. 1.

Referring specifically to FIG. 16, there is shown a schematic logic diagram of a prearb latch 144. The prearb latch 144 receives all outgoing bus request signals from the registry latch 138 that its BRL input 142. In addition, the prearb latch 144 receives all signals from those devices which have been selected to be granted access to the bus at its BSEL input 130. The prearb latch 144 turns off all the select signals to those devices which have been selected to gain access to the bus. In addition, any device which is determined to have already had access to the bus prior to other devices which are currently requesting access to the bus are denied their request due to the fairness logic mechanism. The prearb latch 144 output signals from all devices which are currently selected and being selected at its BSET output 146. All selected device signals enter the priority enable circuit 148 shown in FIG. 15 at their respective BSET input 146 designation. The priority enable circuit 148 determines which device should be granted the highest priority and thus be the next device to receive access to the bus. The selected devices are outputted from the priority enable circuit 148 at its BSEL output 130.

Figure 17:
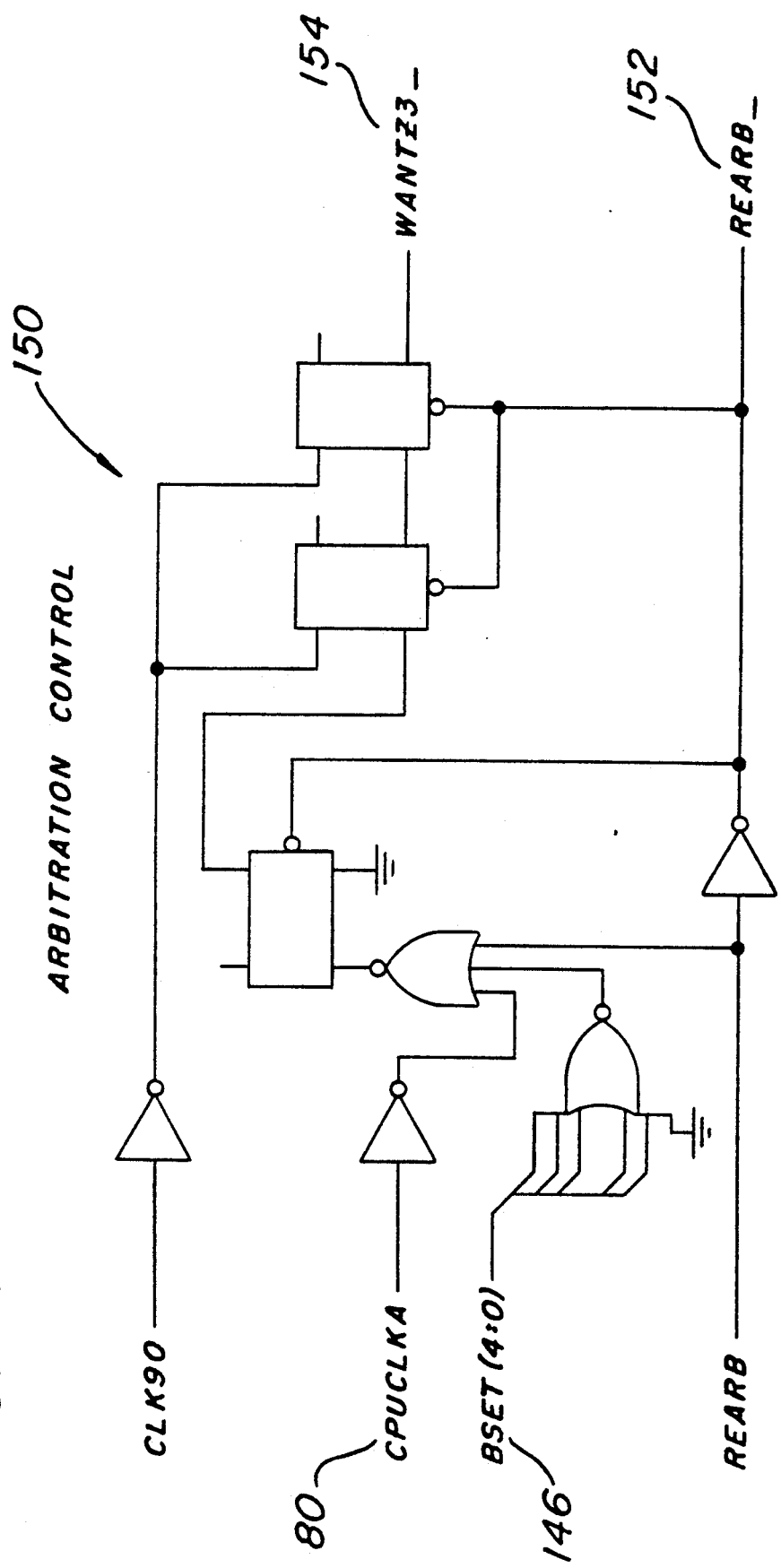
FIG. 17 is a schematic of an arbitration control circuit of the bus arbitration system of FIG. 1.

Referring to FIG. 17, there is shown a schematic logic diagram as an arbitration control circuit 150. The arbitration control circuit 150 receives all incoming signals from devices currently selected to access the bus at its BSET input 146. A clock signal is also inputted at the CPUCLK input 80 and used as a sampling mechanism to quantize the BSET inputs. The arbitration control circuit 150 monitors the status of a device which is currently accessing the bus and determines the order in which succeeding devices will be allowed access to the bus. When a signal is outputted at the REARB output 152, it indicates that a new arbitration or a re-arbitration is to be initiated. When the REARB signal is asserted, the WANTZ3 output 154 is negated. If additional new style bus masters are requesting access to the bus as indicated by the BSET input 146, a signal is asserted at the WANTZ3 output 154 once the clock signals CPUCLK and CLK90 signals are sampled, thus beginning the enable process for the next new style bus master.

Figure 18:
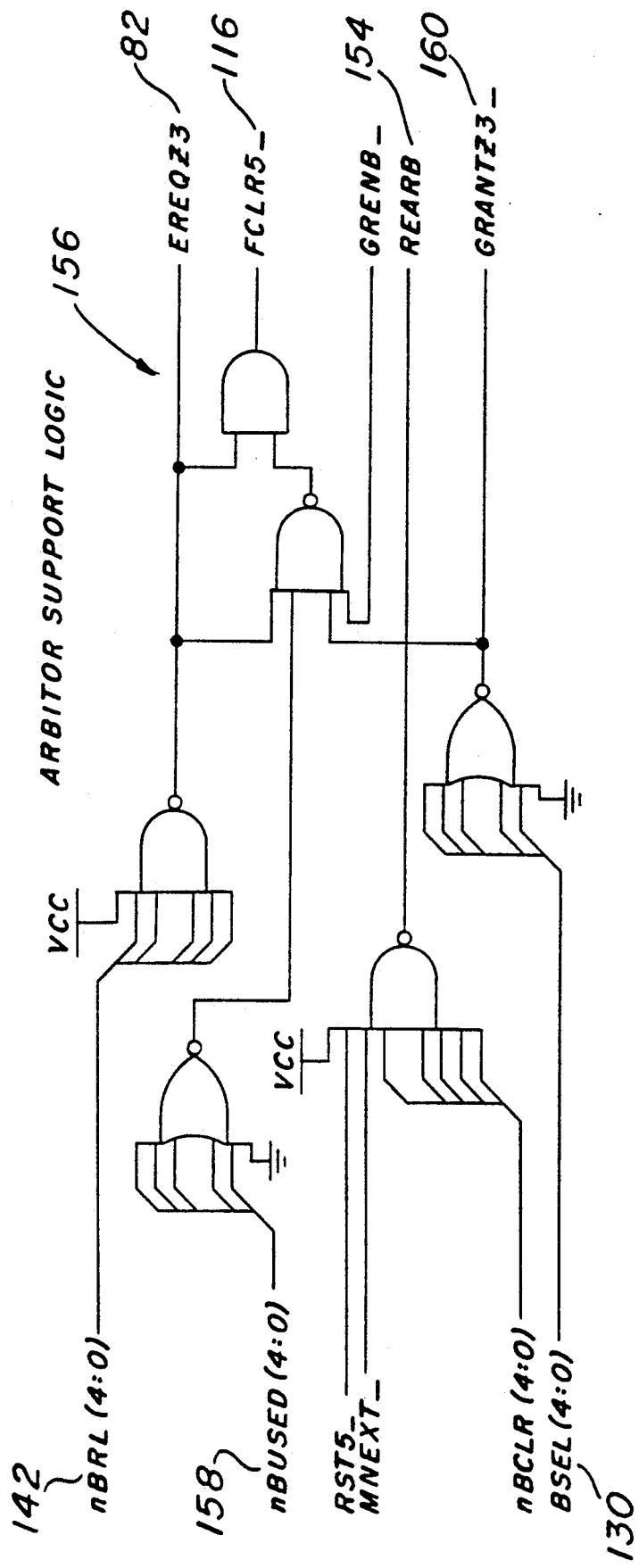
FIG. 18 is a schematic of an arbiter support logic circuit of the bus arbitration system of FIG. 1.

Referring to FIG. 18, there is shown a schematic logic diagram for arbiter support logic 156. The arbiter support logic 156 receives all outgoing bus request signals from the registry latch 138 at its BRL input 142. The arbiter support logic 156 also receives all incoming signals from those devices which have been selected to gain access to the bus at its BSEL input 130. If a situation exists where all bus request signals have been granted by the bus, a signal is asserted to the BUSED input 158 of the arbiter support logic 156. This causes an FCLR signal to be outputted at the FCLR output 116 of the arbiter support logic 156 which clears all signals so that the registry latch 138 can be reset. The FCLR signal is asserted if no devices are currently requesting access to the bus or any situation where all of the devices which have requested access to the bus have already gained access to the bus. If there are devices which are currently requesting access to the bus, the bus request signals are passed through and outputted from the arbiter support logic 156 at it EREQZ3 output 82. Likewise, if a device has been granted access to the bus, the grant signal is outputted from the arbiter support logic 156 at the GRANTZ3 output 160. If the device is currently accessing the bus, the arbiter support logic 156 can output a signal at the REARB output 154 which provides gaps between succeeding grant signals asserted by the bus.

Figure 19:
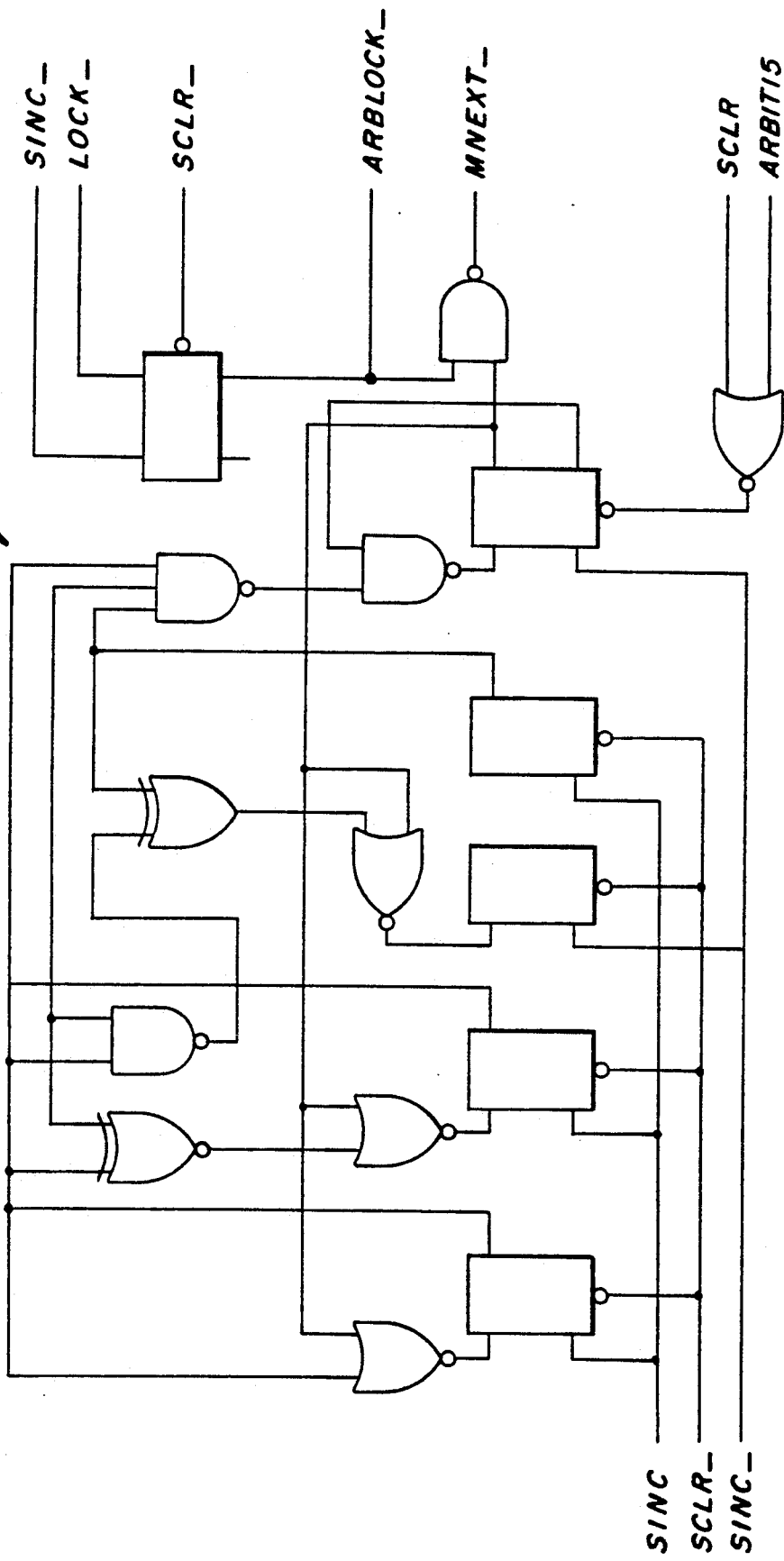
FIG. 19 is a schematic of a mastership scheduler of the bus arbitration system of FIG. 1.

Referring to FIG. 19, there is shown a schematic logic diagram of the mastership scheduler 162 for determining the amount of time in which a new style device can gain access to the bus. The mastership scheduler 162 includes a timer which counts the number of bus cycles which occur while a new style device is accessing the bus. In the preferred embodiment, the mastership scheduler 162 measures eight bus cycles before relinquishing access of the bus to the current new style device. The scheduler will permit more than 8 bus cycles when the bus is locked by the current master, as indicated by the LOCK input. Each time a new style device relinquishes the bus, the mastership scheduler is reset such that it can measure the accessing time for the next new style device.

Figure 20:
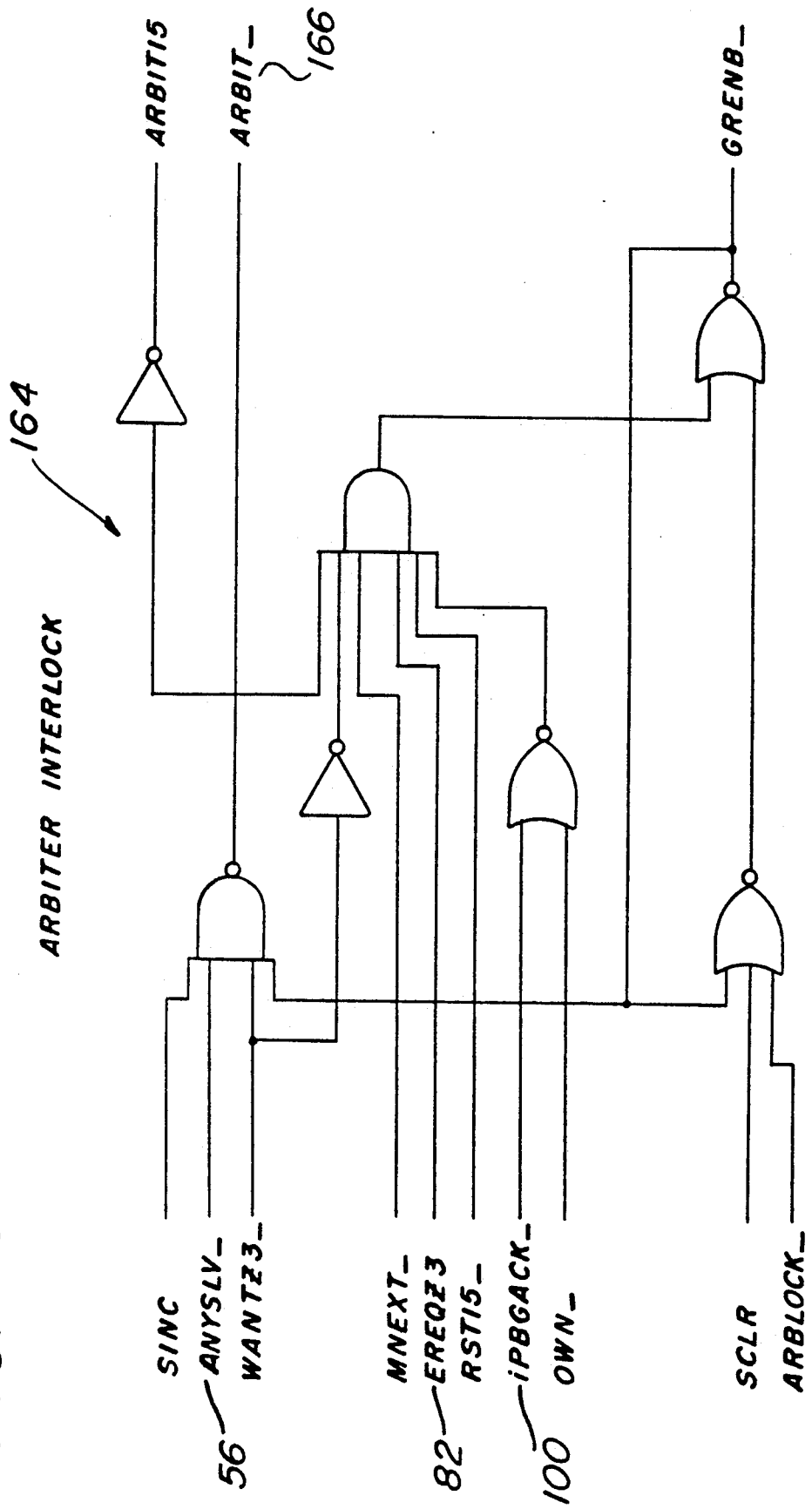
FIG. 20 is a schematic of an arbiter interlock circuit of the bus arbitration system of FIG. 1.

Referring to FIG. 20, there is shown a schematic logic diagram for an arbiter interlock 164. The arbiter interlock 164 determines when a new arbitration cycle is to begin. When the arbiter interlock 164 receives an input from the various number of possible sources indicating that the present arbitration cycle is completed, the arbiter interlock generates a signal at the ARBIT output 166 which indicates the start of a new arbitration cycle. Various inputs into the arbiter interlock 164 can include an ANYSLV input 56 which indicates that no device is presently requesting or responding to the bus. The arbiter interlock 164 also receives a signal at its PBGACK input 100 if a 68030 type device is currently accessing the bus. The arbiter interlock 164 also outputs a GRENB signal 168 which goes low during the period in which a new style device is accessing the bus. The GRENB output 168 causes one of the selector signals to be turned on in a low state and to stay in a low state until sometime during the eighth clock cycle during which the new style device is accessing the bus. As discussed above, a new style device is normally only permitted on the bus for eight clock cycles. The GRENB output 168, therefore, indicates to the arbiter interlock 164 that a current access cycle is ending in a new arbitration cycle will be initiated shortly thereafter.

Figure 21:
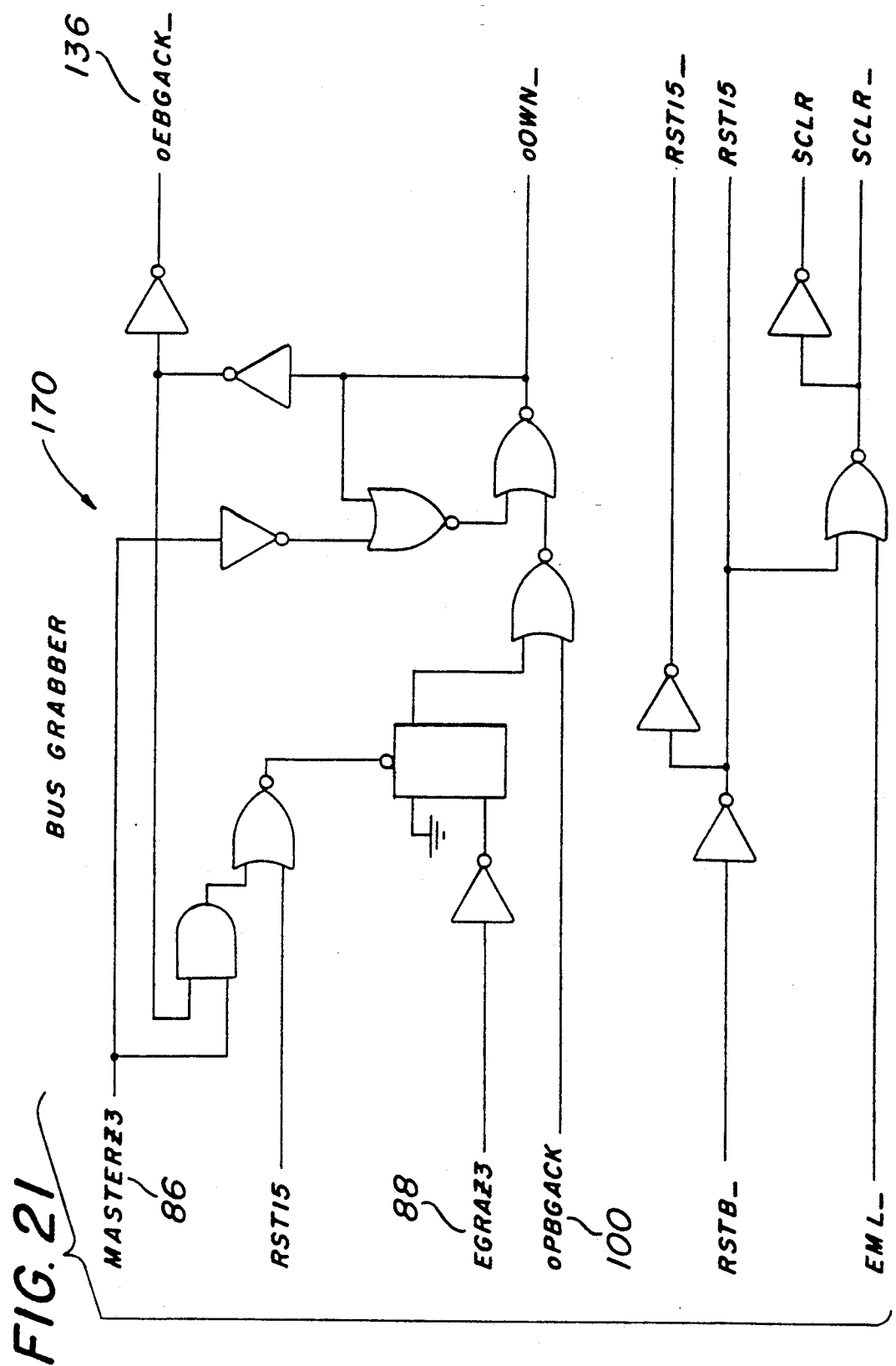
FIG. 21 is a schematic of a bus grabber circuit of the bus arbitration system of FIG. 1.

Referring to FIG. 21, there is shown a schematic logic diagram for a bus grabber 170. The bus grabber 170 determines when a new style device can access the bus. The bus grabber 170 determines when a new style device has been indicated to be the next bus master when it receives a signal at its MASTERZ3 input 86. Likewise, other devices which are indicated as becoming the bus master in a later point in time are received at input the EGRAZ3 88. If a new style device is already accessing the bus, a signal is received at the PBGACK input 100. When the particular device being monitored by the bus grabber 170 has been granted accessed to the bus, the bus grabber 170 outputs a signal at its EBGACK output 136 to indicate that the device has acknowledged that the new style device is currently accessing the bus.

Figure 22:
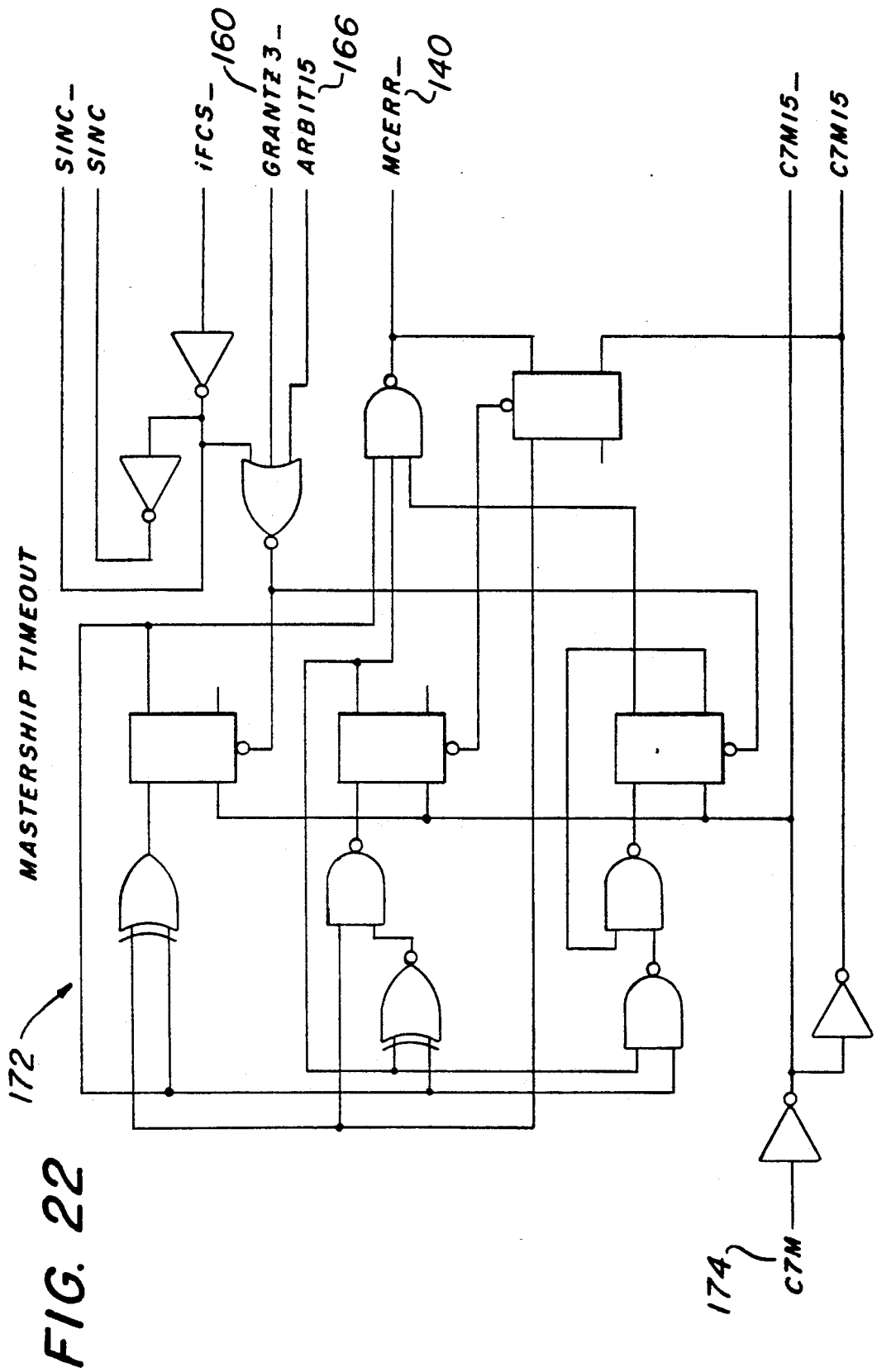
FIG. 22 is a schematic of a mastership timeout circuit of the bus arbitration system of FIG. 1.

Referring to FIG. 22, there is shown a schematic logic diagram for a mastership timeout circuit 172. The mastership timeout circuit 172 indicates when a device has been granted access to the bus but does not actually access the bus within a predetermined period of time. The mastership timeout circuit 172 monitors the bus for a predetermined number of clock cycles at its C7M input 172. If the device which has been granted access to the bus does not supply a signal to FCS input, the mastership timeout circuit 172 outputs a signal at its MCERR output 140 to indicate that the present arbitration cycle should be abandoned. As discussed above, the MCERR signal is received at the input of the registry latch 138 which causes the fairness mechanism to reset.

Figure 23:
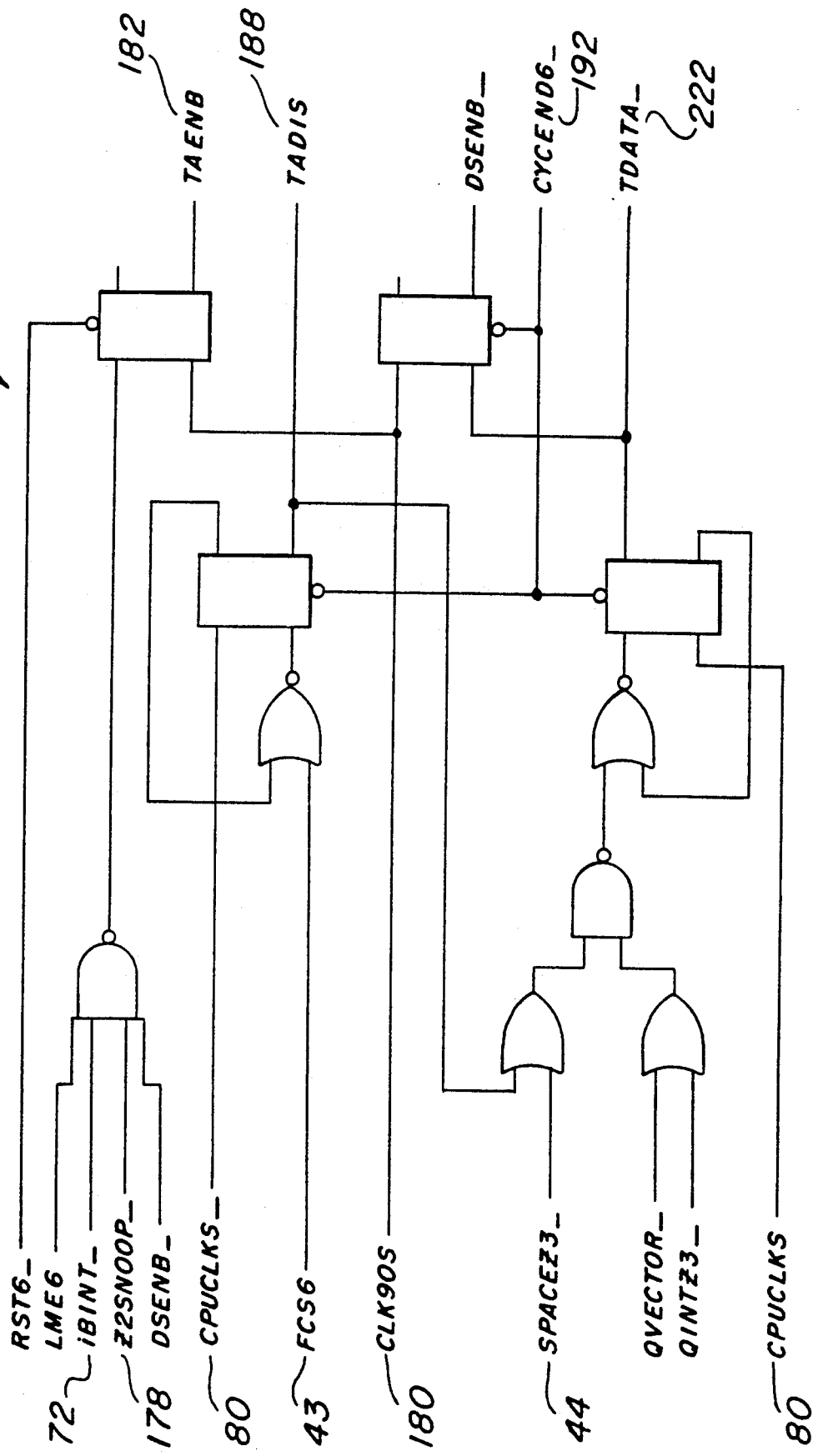
FIG. 23 is a schematic of a cycle state circuit of the bus arbitration system of FIG. 1.

Referring to FIGS. 23-26, there is shown the schematic logic diagrams depicting the basic logic required to convert a Motorola 68030 cycle to new style bus cycle for accessing the bus. At the beginning of the data cycle, an address strobe is driven by the motherboard bus master. At this time, address buffers are driven onto the bus and data buffers are driven off the bus. Referring to FIG. 23, there is shown the schematic logic diagram for a cycle state circuit 176 which determines when a new style device can begin a data cycle. The cycle state circuit 176 receives inputs at its SPACEZ3 input 44 which indicates that a new style device wishes to access new style memory space on the bus. The cycle state circuit 176 also monitors any old style devices which are currently accessing the bus at its Z2SNOOP input 178 to ensure that the new style device pending access to the bus will not be received by the bus while the old style device is still accessing the bus. The cycle state circuit 176 receives inputs from clocks at its CPUCLK input 80 and its CLK90 input 180. The CPUCLK clock 80 runs at 90° ahead of the CLK90 clock 180. Both clock edges are used to monitor events which occurred during the data cycle. When the cycle state circuit 176 determines that the addresses to be driven onto the bus by the new style device have been valid for a predetermined amount of time a full cycle strobe is initiated at its FCS input 43. The full cycle strobe is only driven for valid bus addresses. The full cycle strobe defines whether or not a cycle is currently running on the bus. The full cycle strobe also determines which type of cycle is to be run. The negation of the full cycle strobe indicates the end of the cycle. At this point, data is driven off the bus. When the full cycle strobe is initiated, the cycle state circuit outputs a signal at its TAENB output 182 indicating that the address buffers can be enabled. The TAENB output 182 also ensures that there are no pending errors, i.e., that all data buffers are turned off and that no old style devices are currently accessing the bus. The TAENB output 182 monitors all error and old style snoop inputs. When stable conditions are present, the TAENB signal is asserted and all external address buffers are turned ON. At this point, an FCS signal is driven onto the bus. At a later point in time, a TADIS signal is outputted to turn OFF the address buffers.

Figure 24:
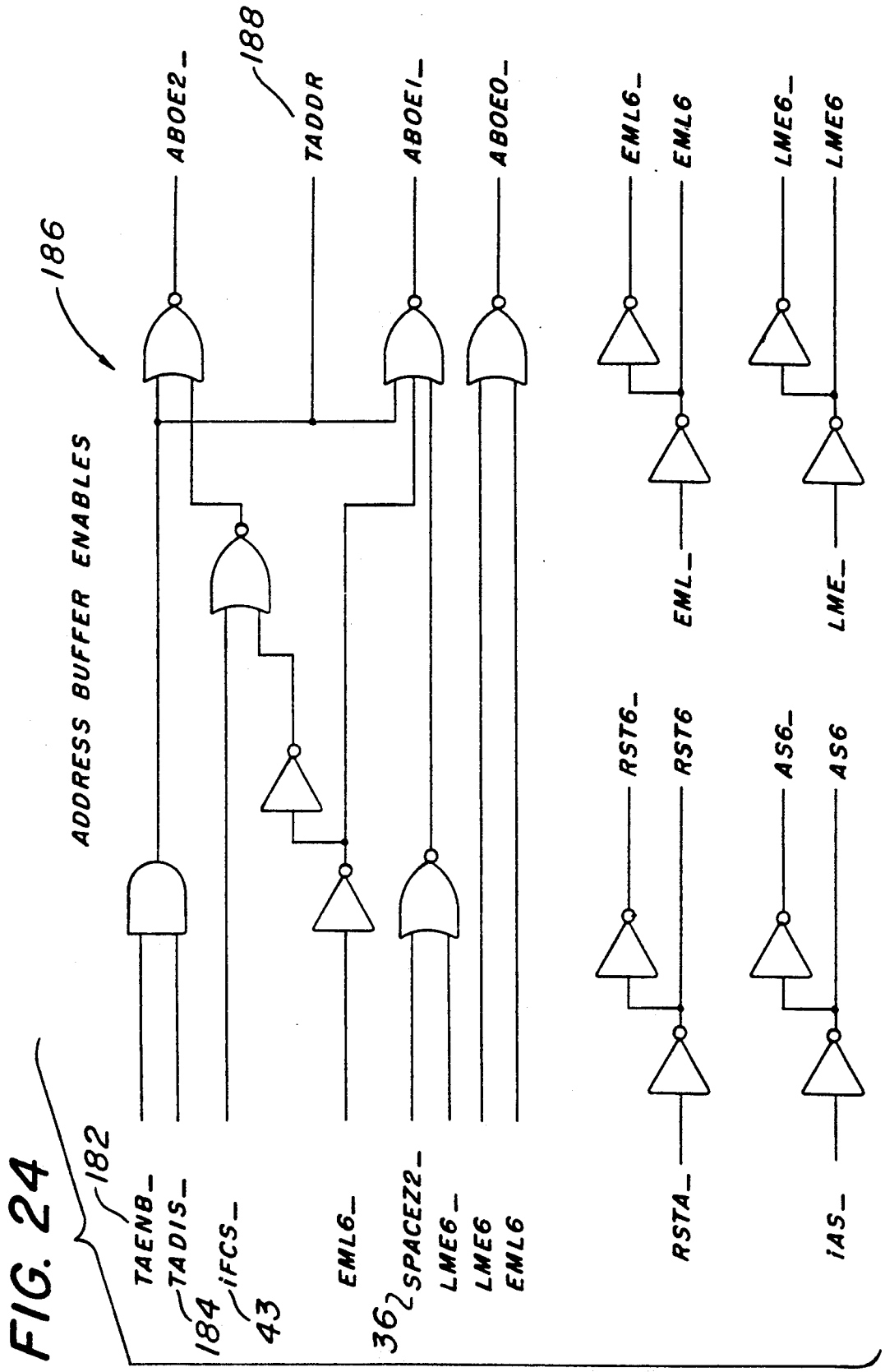
FIG. 24 is a schematic of an address buffer enable circuit of the bus arbitration system of FIG. 1.

Referring to FIG. 24, there is shown a schematic logic diagram for an address buffer enable circuit 186. A signal is received at the TAENB input 182 which causes the address buffers to be turned ON. A cycle state circuit 176 indicates that the address buffers have been enabled. When the cycle is completed a signal is received at the TADIS input which causes the address buffers to be turned OFF. At a later point in time, a signal is received at the TDATA input 222 (FIG. 30) which causes the data buffers to be turned ON. When the address buffer enable circuit 186 has received the TAENB signal, the address buffer enable circuit 186 waits for a full cycle strobe to be asserted at its FCS input 43 such that it can assert the address buffers onto the bus at its TADDR output 188.

When the full cycle strobe falls logically, certain address buffers are immediately turned off. For a two-wire expansion bus cycles, addresses corresponding to address bits 8-31 are turned off. For a three-wire expansion bus cycles, addresses correlating to addresses 24-31 are turned off. In addition, three-wire expansion bus cycles must experience a synchronization delay in order to allow the three-wire expansion bus clock to synchronize with the currently running address strobe. If the three-wire expansion bus cycle is running, a compatibility cycle strobe is asserted as discussed above. The compatibility cycle strobe is similar to the Motorola 68000 8.0 MHz clock and confirms Motorola style 68000 timing. For a two-wire expansion bus cycle, no compatibility cycle strobe is asserted, and when appropriate address buffers are on, a slave signal is initiated which initiates handshake instructions. The slave signal is driven on the handshake line by the responding slave device. The responding slave device driving the slave signal indicates to the bus master that in fact there is a device responding to the address. Note that a slave signal will always immediately follow an FCS strobe.

Figure 25:
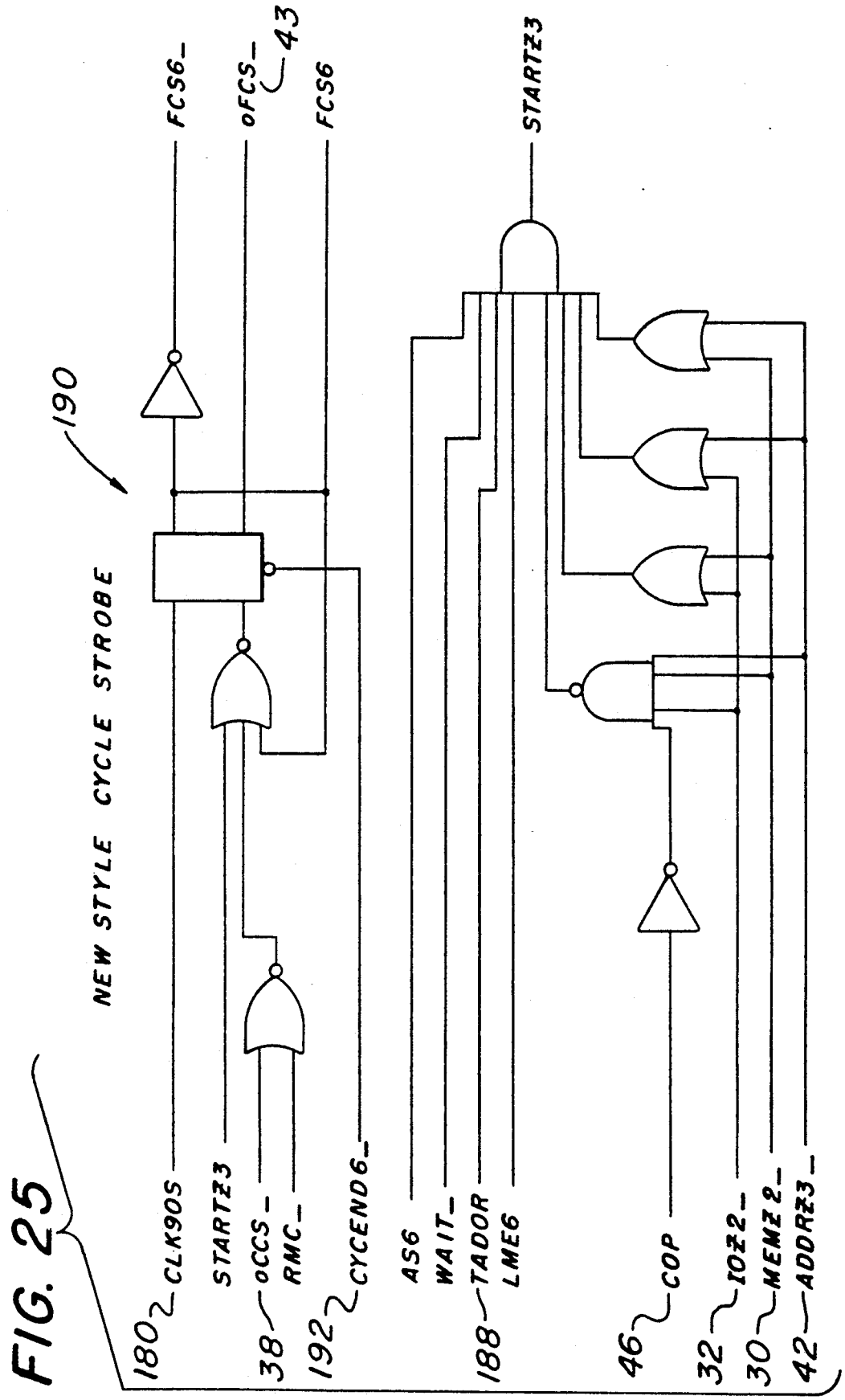
FIG. 25 is a schematic of a cycle strobe circuit of the bus arbitration system of FIG. 1.

Referring to FIG. 25, there is shown a schematic logic diagram of a cycle strobe circuit 190 for initiating a full cycle strobe. The cycle strobe circuit 190 determines if valid cycle types have been detected. The cycle strobe circuit 190 is used to avoid empty cycles. The cycle strobe circuit 190 receives a signal at its TADDR input 188 when a device which has been selected to access the bus is currently asserting address buffers onto the bus. Likewise, if an old style device is using I/O space or memory space, a signal is asserted to its IOZ2 input 32 or its MEMZ2 input 30, respectively. When 32 bit address space is being accessed on the bus, a signal is received by the cycle strobe circuit 190 at its ADDRZ3 input 42. When a device successfully completes a cycle, the cycle strobe circuit 190 receives a signal at its CYCEND6 input 192. If for some reason a start of a succeeding cycle must be delayed, the cycle strobe circuit receives a delay signal at its WAIT input.

Figure 26:
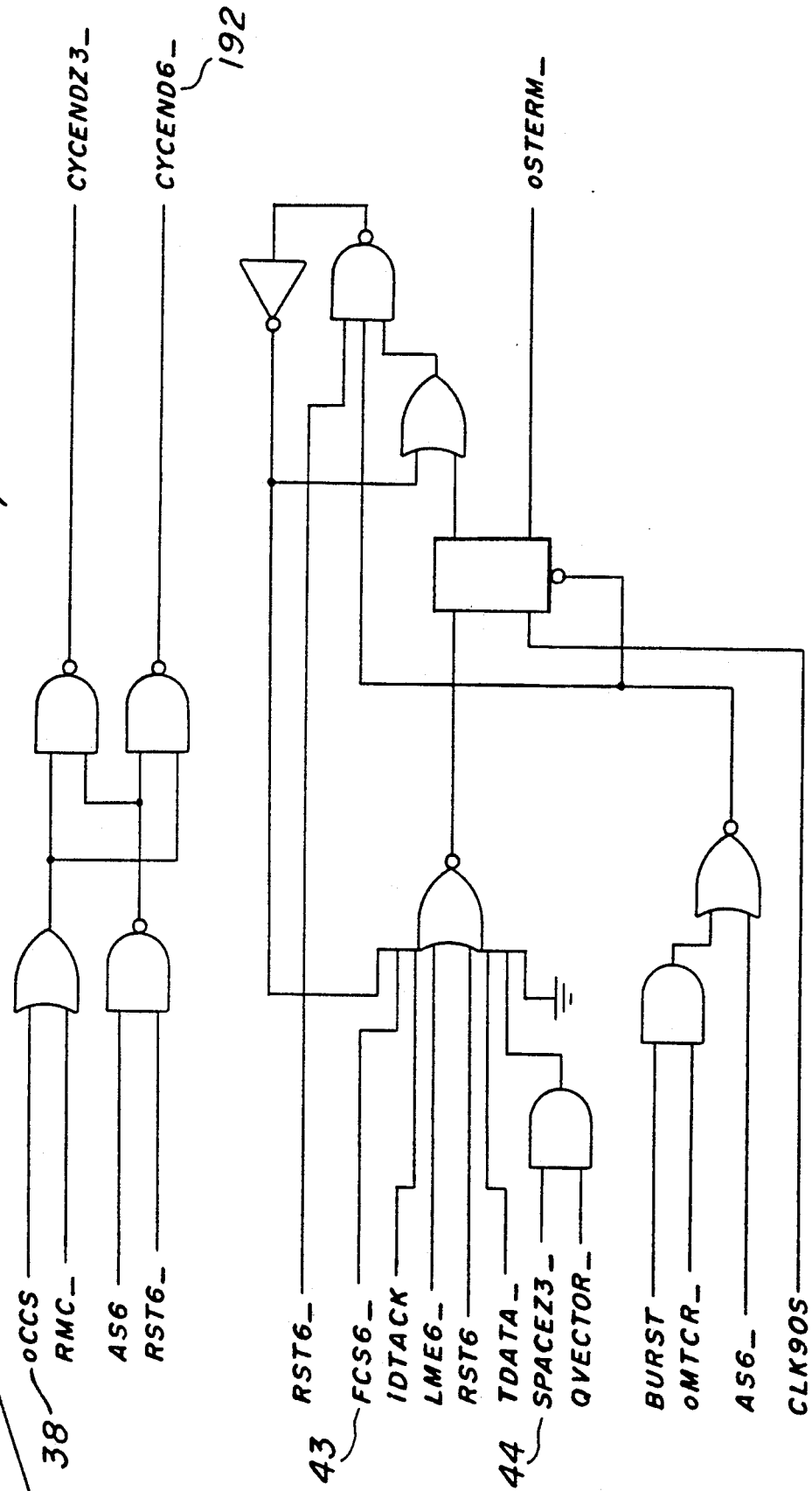
FIG. 26 is a schematic of an end of cycle circuit for the bus arbitration system of FIG. 1.

Referring to FIG. 26, there is shown a schematic logic diagram for on end of cycle circuit 194 which determines when a new style device has completed its arbitration cycle and will be relinquishing the bus.

Figure 27:
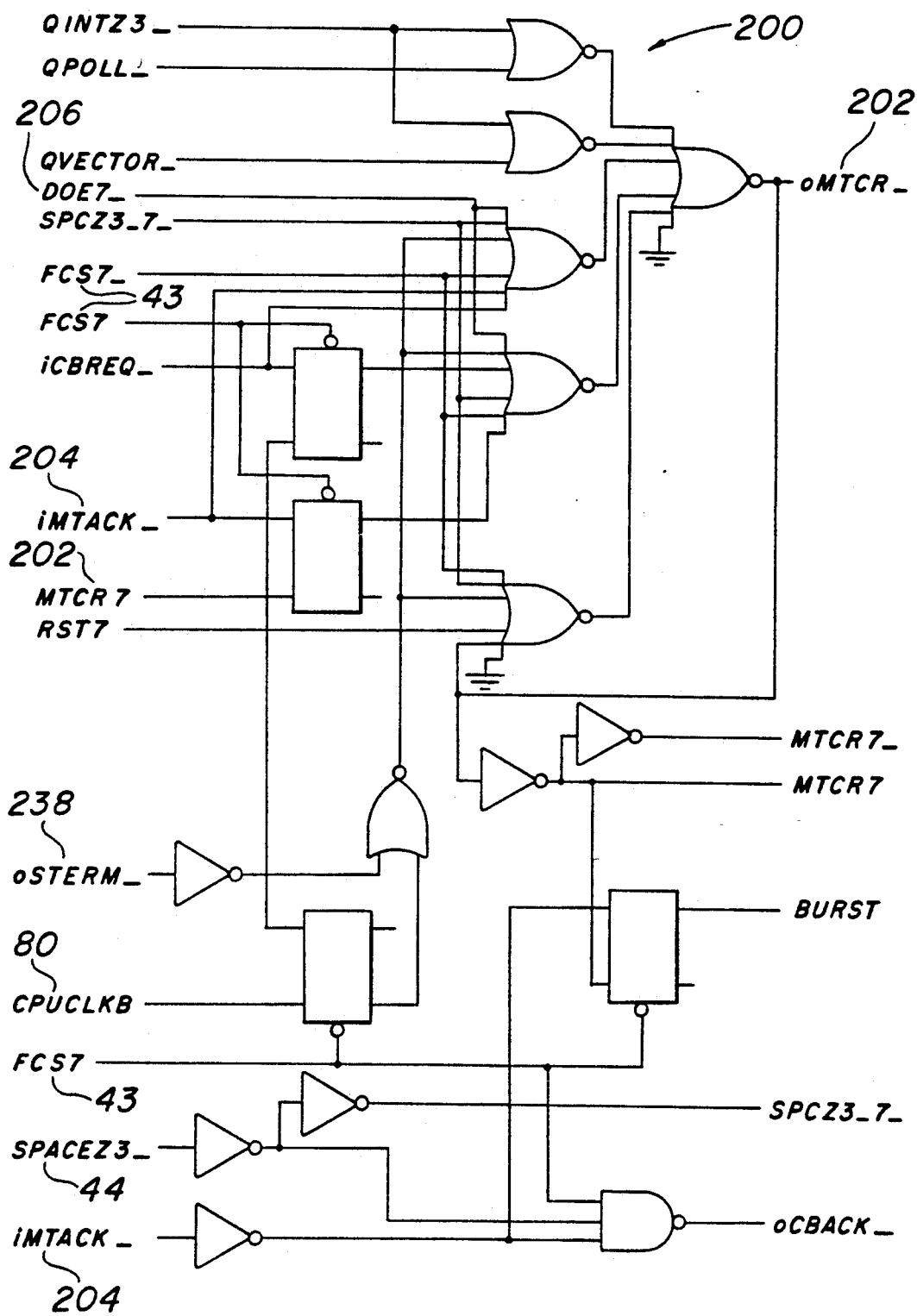
FIG. 27 is a schematic of a multiple transfer strobe circuit of the bus arbitration system of FIG. 1.

Referring to FIG. 27, there is shown a schematic logic diagram for a multiple transfer strobe circuit 200. A two-wire or new style expansion bus allows for multiple transfer cycles which are known as burst modes. The multiple transfer cycles begin in the same manner as any ordinary two-wire expansion bus cycle. However, the multiple transfer cycle results and transfers a multiple 32 bit data words. The multiple transfer cycles start with a normal full cycle strobe which is received at the FCS input 43. The full cycle strobes are followed by the removal of higher address bits and the retention of lower address bits. In addition, a multiple transfer cycle handshake signal is inputted at the MTCR input 202 of the strobe circuit 200. The multiple transfer cycle handshake signal asserts a strobe to define the number of subcycles. The MTCR signal is asserted during interrupt or burst cycles. Each subcycle has a new lower address, and a new read or new write instruction. The selected slave device latches onto the address and responds to MTCR signal by asserting a slave signal. The slave device selected is based on the address presented when the full cycle strobe is asserted and the single slave device which responds with its slave handshake at the SPACEZ3 input 44. If the selected slave device is capable of receiving multiple cycles it also asserts a multiple transfer acknowledgment signal at the MTACK input 204. During a multiple transfer cycle, the bus master and slave are locked together so that no new slave arbitration can take place. Note that if either the MTCR input 202 or the NTACK input 204 is negated during the cycle, the resulting cycle will be a basic full cycle, i.e., no multiple 32 bit transfers will be allowed.

Once the multiple transfer handshake goes through, the multiple cycle goes into the data phase. The master controller asserts the data output enable signal at its DOE input 206 and the appropriate data strobe. Note that the full cycle strobe and the data input enables the strobe to be asserted through any number of these subcycles. The selected slave device responds to the bus master by asserting a multiple transfer acknowledgment signal at the MTACK input 204. As long as the slave continues to assert the MTACK signal and the bus master asserts the MTCR signal, a new low order address and read or write command is given to the current slave device each time the bus master asserts the MTCR signal and the slave device responds with its MTACK signal. Likewise, during the write cycle, the selected slave device asserts the data acknowledgment signal when the slave device is through accessing the data on the bus. To terminate the multiple transfer cycle, the bus master negates the data strobe and the MTCR signal.

Figure 28:
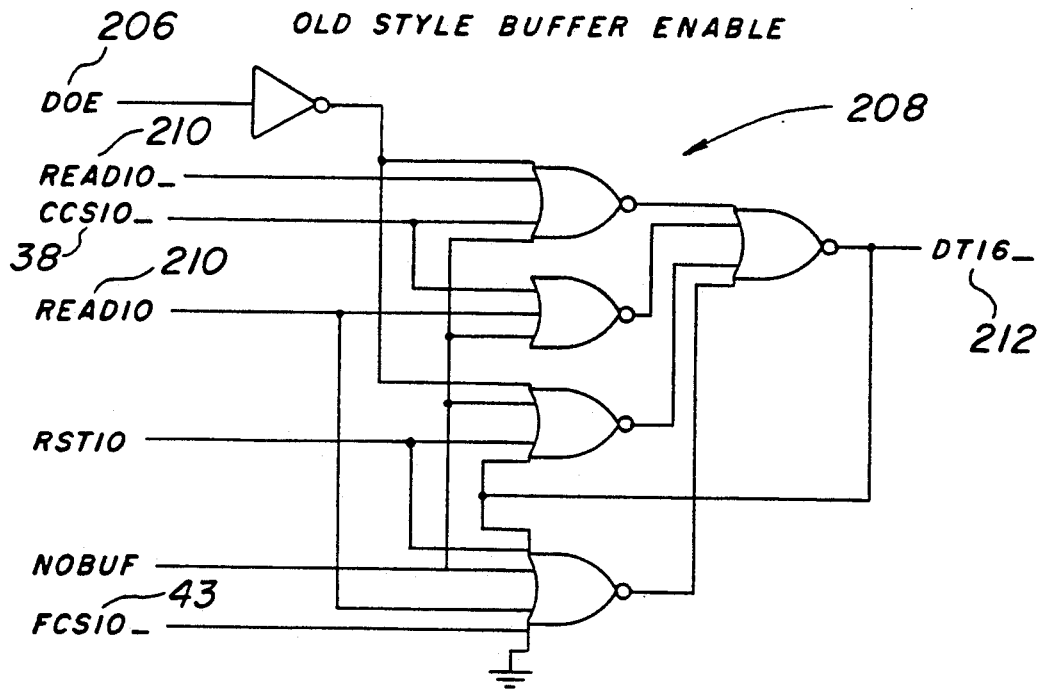
FIG. 28 is a schematic of a buffer enable circuit for the bus arbitration system of FIG. 1.
Figure 30:
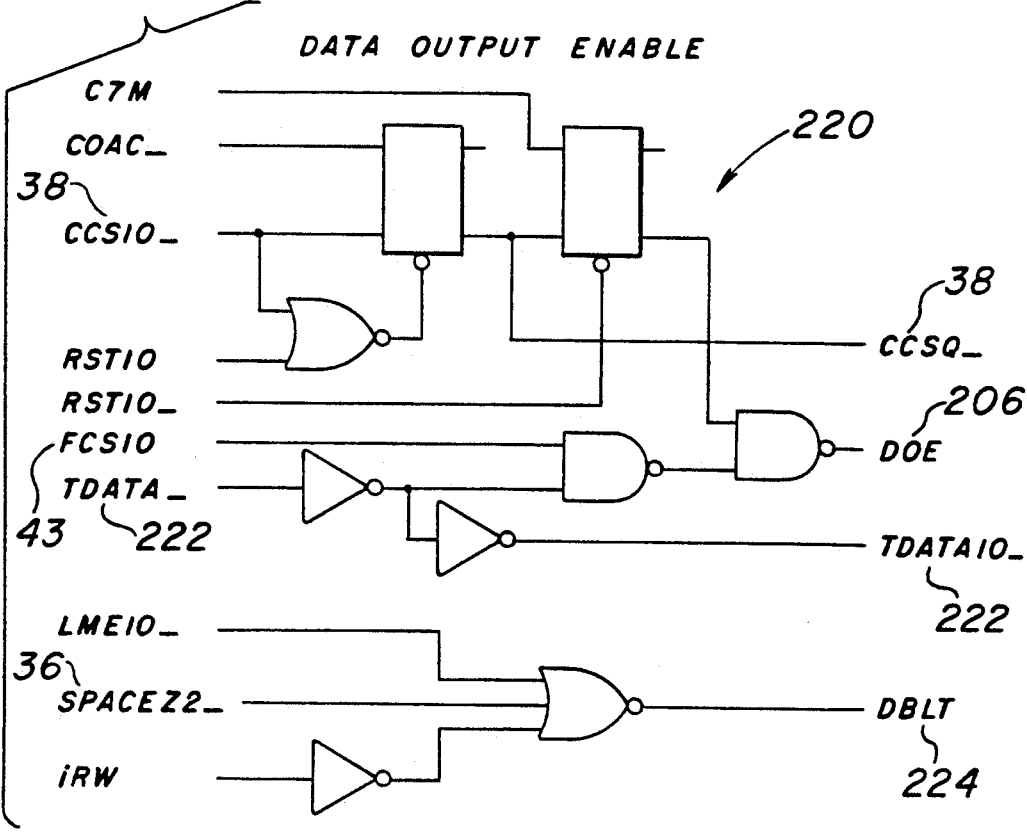
FIG. 30 is a schematic of a data output enable circuit of the bus arbitration system of FIG. 1.
Figure 29:
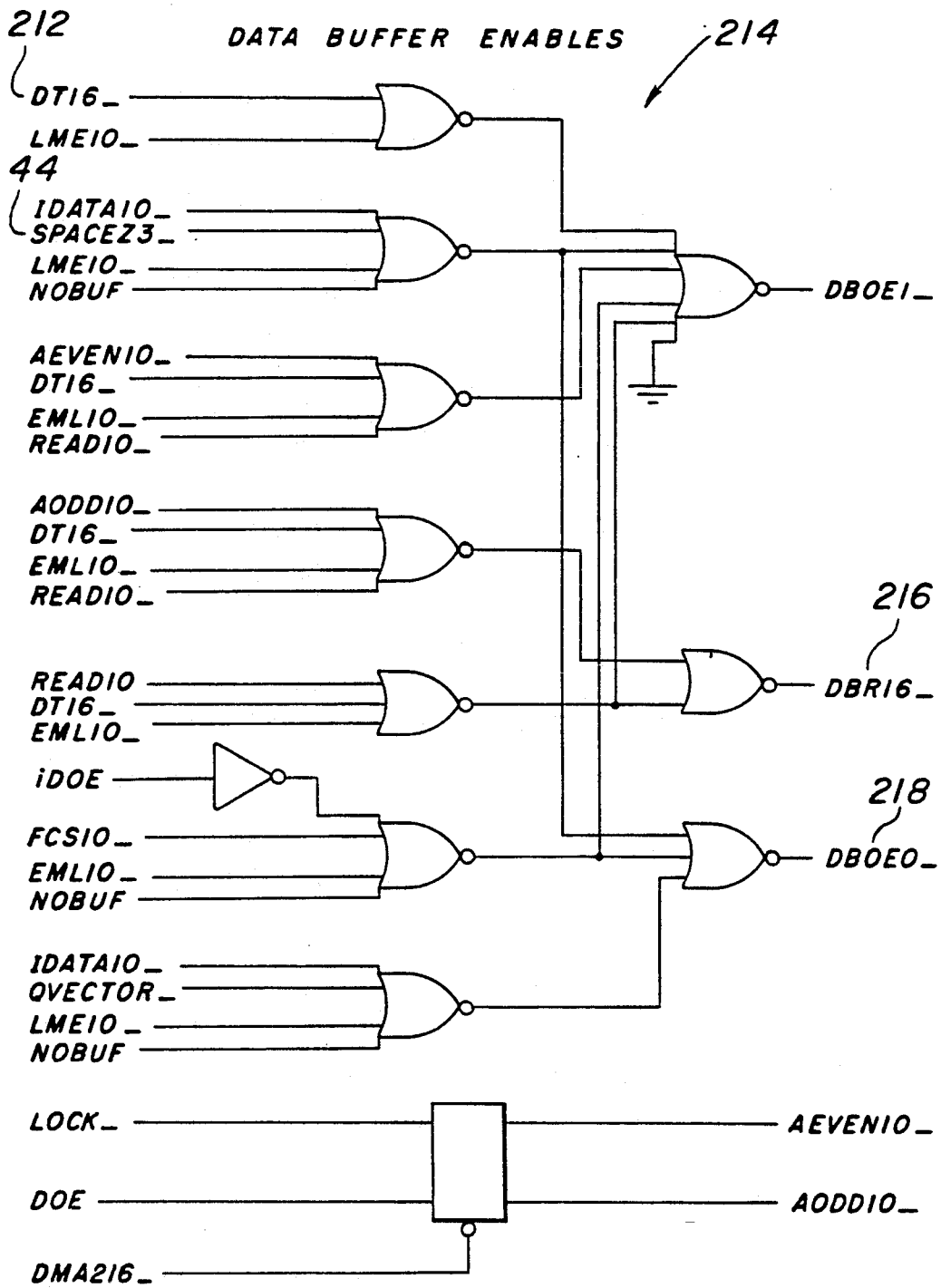
FIG. 29 is a schematic of a data buffer enable circuit of the bus arbitration system of FIG. 1.

Referring to FIGS. 28-30, there are shown schematic logic diagrams for data buffer control logic. Referring specifically to FIG. 28, there is shown a schematic logic diagram for an old style buffer enable circuit 208. The buffer enable circuit 208 determines if incoming data is from a 16 bit device or a 32 bit device. An old style device sending data to the circuit will be accompanied by a compatibility cycle strobe which is inputted at the CCS input 38. If the device is performing a read cycle, the data is received at the READ input 210. In order for the device to go through with the data cycle, a data output enable signal must be received by the buffer enable circuit at its DOE input 206. The buffer enable circuit 208 analyzes the incoming data and determines whether the device is a 16 bit device or a 32 bit device. The buffer enable circuit outputs the resulting data at its DT16 output 212.

Referring specifically to FIG. 29, there is shown a schematic logic diagram for a data buffer enable circuit 214. The data buffer enable signal receives three pairs of buffers. The data buffer enable circuit 214 receives a signal at its DT16 input 212 indicating whether the device currently accessing the bus is a 16 bit device or a 32 bit device. In either case, the upper half of the motherboard and the upper half of the expansion bus must be accessed in order to complete a 32 bit transfer.

There are three data buffer groups, and four basic types of transfers. The main CPU can address an expansion slave, which can be either a new style device or an old style device. The upper half of the bus is controlled by the DBOE1 output 215 and is enabled in both cases. When the slave device is a new style device, both the DBOE1 output 215 and the DBOE0 output 218 and asserted. For new style interrupt cycles, only the DBOE0 output 218 is needed. When the bus master addresses the motherboard as a slave, there are two possible cases. If the master is a new style device, a full 32 bit transfer is necessary and both the DBOE1 output 215 and the DBOE0 output 218 are enabled. If the master is an old style device, however, the enabled buffer pair depends on which half of the 32 bit motherboard bus is accessed. If the even half of the motherboard bus is accessed, the DBOE1 output 215 is asserted. If the odd half of the motherboard bus is accessed, the DBR16 output 216 is asserted, connecting the lower half of the motherboard bus to the higher half of the expansion bus.

Referring to specifically to FIG. 30, there is shown a schematic logic diagram for a data output enable circuit 220. The data output enable circuit 220 outputs a signal at its DOE output 206 which is received by the data buffer enable circuit 214 to indicate that it is safe to turn the data buffers on. The data output enable circuit 220 has inputs to receive a compatibility cycle strobe at its CCS input 38 if the device is a 16 bit device or a full cycle strobe at its FCS input 43 if the device is a 32 bit device. The data to be outputted is received at TDATA input 222 of the data output enable circuit 220. When the data is ready to be received by the data buffer enable circuit, the data output enable circuit 220 outputs a signal at its DOE output 206 and its TDATA output 222. A output is also received at the DBLT output 224 which acts to latch the data bus. When a 16 bit device is performing a read cycle, the data must be latched at the end of the cycle to compensate for the CPU clock.

The data phase of the cycle occurs when the bus master asserts the data output enable signal onto the bus indicating that data operations can be started. The data bit drivers access data bits $D_0-D_{31}$ which cause the bus controller to be responsible for responding to slave signals.

During a read signal, the bus master drives at least one of the data strobes, i.e., $DS_3-DS_0$, which indicate the physical transfer size requested. The data strobe lines qualify which bytes within a 16 bit word or 32 bit word are of interest to the bus master. When cachable slaves are used, all 32 bits reserved for incoming data must be supplied. The selected slave device responds by driving data onto the bus and then asserting a data transfer acknowledgment signal (DTACK) as will be discussed hereinafter. The bus master then terminates the cycle by negating the full cycle strobe and any other control signals presently asserted by the bus. This indicates that the bus master is finished with the data on the bus.

During a write cycle, the data output enable signal is also asserted. The bus master drives data onto the bus and then asserts at least one data strobe to indicate to the selected slave device if the data transmitted is valid and which data bits are being written. The selected slave device now has access to the data on the bus. Once the slave device is finished with the bus, it can terminate the cycle by asserting the data transfer acknowledgment signal at which point the full cycle strobe is negated by the bus master.

Figure 32:
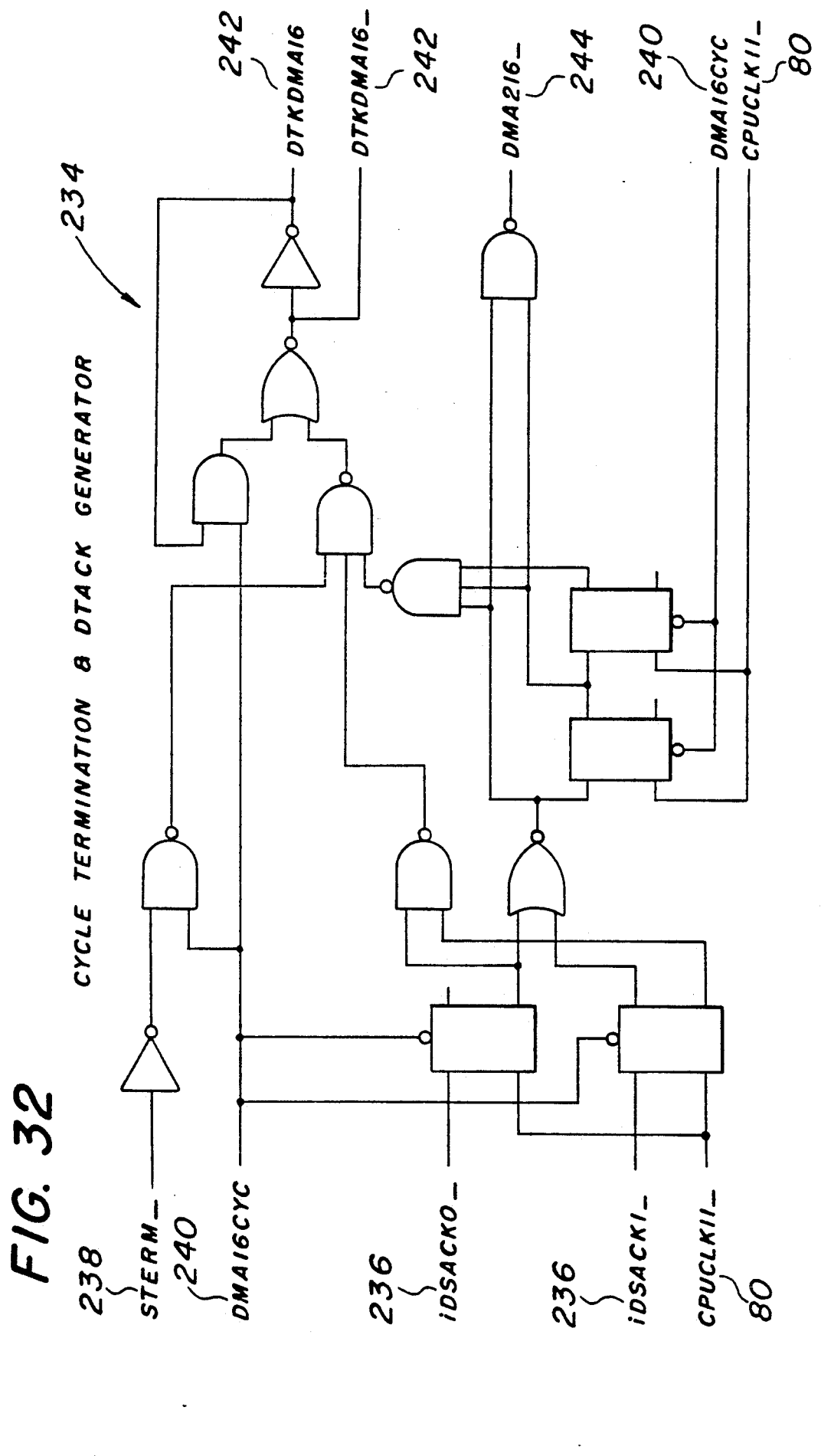

Referring specifically to FIGS. 31 and 32, there are shown a schematic logic diagram for an old style or 16 bit bus master. Referring specifically to FIG. 31, there is shown a schematic logic diagram of a 16 bit DMA synchronizer 226. The 16 bit DMA synchronizer 226 receives a signal at its PROC input 58 when the motherboard is responding as the slave device. The DMA synchronizer 226 checks for the presence of a compatibility cycle strobe to confirm that a 16 bit device is actually accessing the bus. If the old style device is performing a read cycle, data which is to be read is inputted at the READ input 212 of the DMA synchronizer 226. Data strobes received at the EDS2 and ED23 inputs 228, 230 act to synchronize the data bits with the motherboard clock to create the data signal. The motherboard clock cycle is received at the CPUCLK input 80 of the DMA synchronizer 226. Once the data bits have been synchronized to the motherboard clock, the synchronized signal is outputted at the DMAZ2 output 232 of the DMA synchronizer 226.

As discussed above, an old style device which accesses the bus, is capable of retaining the bus until it physically relinquishes the bus. Unlike the new style devices, the bus master cannot remove the old style device from the bus until it decides to relinquish it.

Referring specifically to FIG. 32, there is shown a cycle termination and DTACK generator 234. The cycle termination and DTACK generator 234 determine when the old style data cycle is to end. The cycle termination and DTACK generator 234 receives an output at its CPUCLK input 80 to indicate the clock cycle of the motherboard clock. An input received at the DSACK input 236 initiates the termination cycle. An input at the STERM input 238 indicates a 68030 synchronous termination signal which is used to support a burst cycle, such as when multiple transfers are occurring. The DMA data cycle is received at the DMA16CYC input 240 of the cycle termination and DTACK generator 234. When the cycle has been terminated, the cycle termination and DTACK generator 234 output a signal to the bus master at its DTKDMA16 output 242. While the cycle is continuing to run, data is sent to the bus master through the DMA216 output 244 of the cycle termination and DTACK generator 234.

Figure 34:
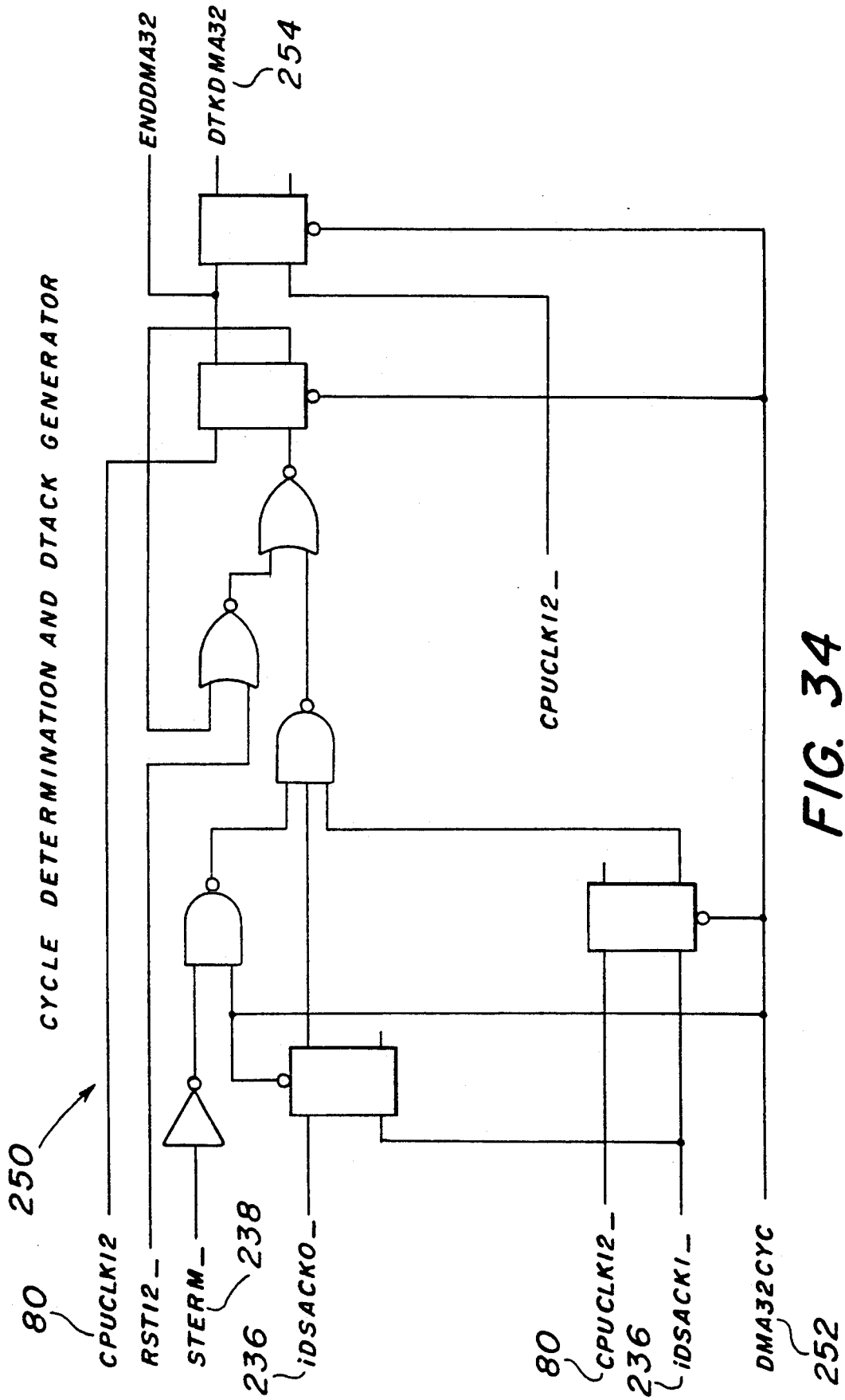
FIG. 34 is a schematic of a 32 bit cycle termination and DTACK generator of the bus arbitration system of FIG. 1.

Referring specifically to FIGS. 33 and 34, there are shown schematic logic diagrams for a new style or a 32 bit device bus master. Referring specifically to FIG. 33, there is a 32 bit DMA synchronizer 246. The 32 bit DMA synchronizer 246 is similar to the 16 bit DMA synchronizer 226 in that it checks for a signal at its PROC input 58 to determine whether the motherboard is currently accessing the data bus. If the motherboard is not accessing the data bus, the 32 bit DMA synchronizer 246 looks for a signal on its FCS input 43 to indicate that a full cycle strobe has been initiated and thus that a 32 bit device is accessing the bus. The motherboard clock cycle is received at the CPUCLK input 80 at the 32 bit DMA synchronizer 246. Data strobes received at the EDS0 input, EDS1 input, EDS2 input 230 and EDS3 input 232 are synchronized with the motherboard clock and are outputted at the DMAZ3 output 248 of the 32 bit DMA synchronizer 246. In addition, the DMAZ3 output 248 can create address strobes, data strobes and read/write signals.

Referring specifically to FIG. 34, there is shown a cycle termination and DTACK generator 250. The cycle termination and DTACK generator 250 receive the motherboard clock cycle at its CPUCLK input 80. If a multiple transfer cycle is occurring, a termination cycle is received at the STERM input 238 of the cycle termination and DTACK generator 250 which is capable of supporting a burst cycle. If a normal data cycle is being run, the data being sent or received from the bus is inputted at the DMA32CYC input 252 of the cycle termination and DTACK generator 250. When the data cycle is to be terminated, a signal is received at the DSACK input 236 of the cycle termination and DTACK generator 250 which initiates the termination cycle. When the termination cycle is completed, a signal is outputted at the DTKDMA32 output 254 of the cycle termination and DTACK generator 250.

Referring specifically to FIG. 35, there is shown a schematic logic diagram for a cycle strobe circuit 256 for a 68030 cycle machine. The cycle strobe circuit 256 receives the DMA output signals from the 16 bit device which may be accessing the bus at its DMAZ2 input 232. If a 32 bit device is accessing the bus, its DMA signal is received at the DMAZ3 input 248 of the cycle strobe circuit 256. The cycle strobe circuit 256 receives an input from the cycle clock at its CYCCLK output 258. The cycle strobe circuit 256 creates the address strobes at its AS output 260, data strobes at its DS output 262 and read/write signals at its RW output 264. If a DMA cycle is continuing, the DMA signal is outputted at the DMACYC output 266 of the cycle strobe circuit. If the DMA signal is to be terminated, the cycle strobe signal receives an input at its DMAOFF input 268.

Figure 36:
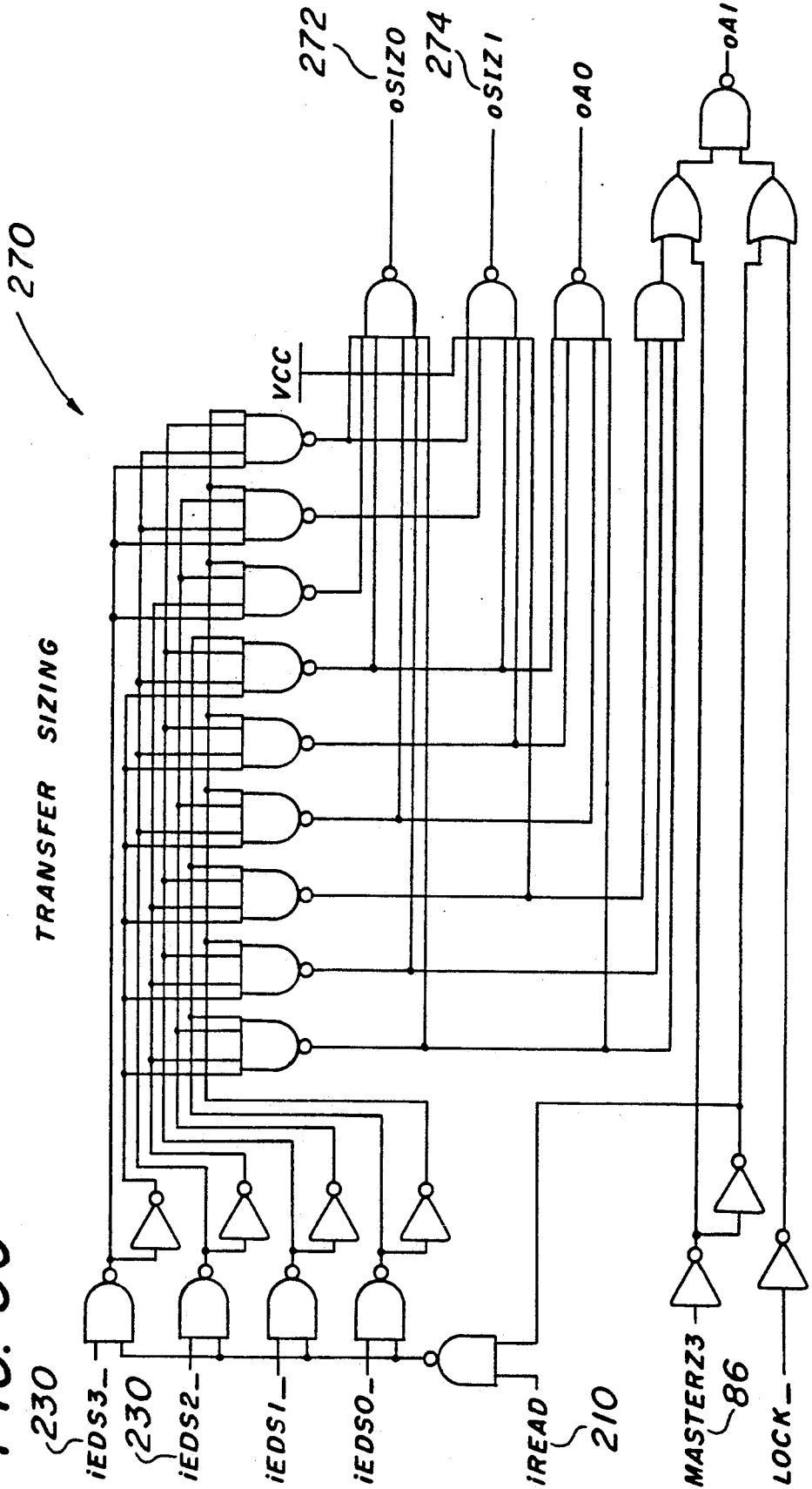
FIG. 36 is a schematic of a transfer sizing circuit of the bus arbitration system of FIG. 1.

Referring to FIG. 36, there is shown a schematic logic diagram for a transfer sizing circuit 270 of the 68030 cycle machine. The transfer sizing circuit 270 receives the data strobes generated by the device currently accessing the bus at its EDS(0—3) inputs. The transfer sizing is necessary for the protocol of the motherboard bus. The transfer sizing circuit outputs the appropriate size at its SIZ0 or SIZ1 output 272, 274.

Referring to FIG. 37, there is a shown a schematic logic diagram for a cycle termination circuit 276 for the 68030 cycle machine. The cycle termination circuit 276 receives the clock cycle signal at its CYCCLK input 258. While the device currently accessing the bus is transmitting its DMA signal, the cycle termination signal receives a data strobe at its DS input 262 and a DMA signal at its DMACYC output 266. When the device is ready to terminate the data cycle, a signal is received at the DTKDMA16 input 242 of the cycle termination signal. This initiates the termination cycle which when ready outputs a cycle at its DMAOFF output 268 which causes the bus to terminate the data cycle.

Figure 38:
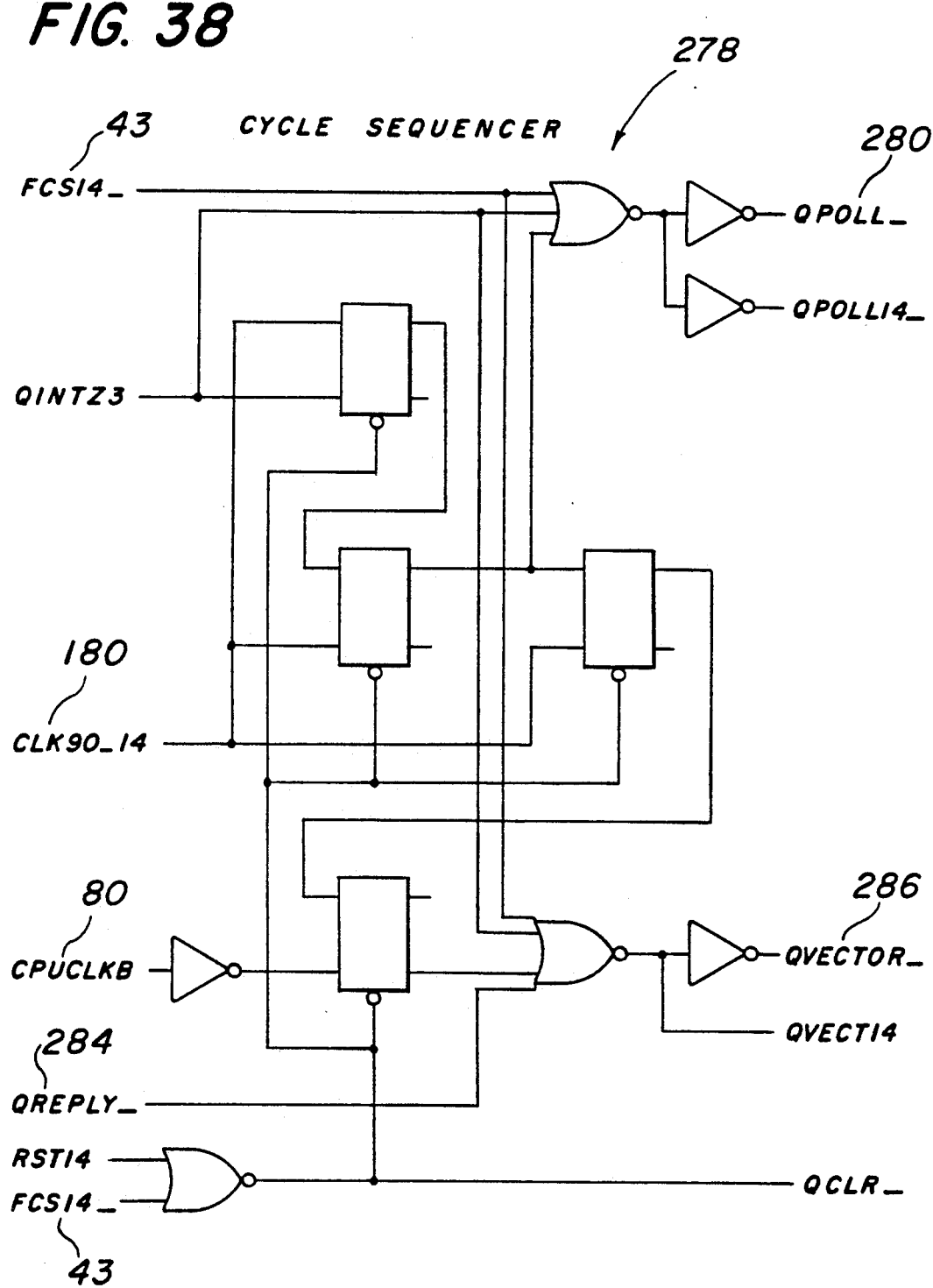
FIG. 38 is a schematic of a cycle sequencer circuit of the bus arbitration system of FIG. 1.

Referring to FIGS. 38 and 39, there are shown a schematic logic diagrams for the interrupt arbitration mechanism of the present invention. An interrupt provides a mechanism for a hardware signal to force the hardware to change its path of execution. Interrupts are acknowledged by the microprocessor only between instructions. The microprocessor cannot be interrupted at the middle of an instruction. In multiboard system, it is important that one or more request signals are not transmitted to the bus at the same time in order to prevent bus contention. An arbitration mechanism is required to prevent collisions between multiple devices responding to interrupt signals at the same time.

Interrupts may be generated by both two-wire and three-wire masters or slaves. All interrupts are on shared open collector level sensitive lines. A new style slave device can asynchronously assert multiple shared interrupt lines. In general, an old style device can only generate a chained automatically vectored interrupt. A new style device may generate an arbitrated self vectored interrupt. To prevent bus contention between responding slave devices, a vector response cycle is run on the bus. Resolution of the interrupt is handled via a single wire slave line protocol.

Referring specifically to FIG. 38, there is shown a schematic logic diagram for a cycle sequencer circuit 278. An interrupt cycle begins with the assertion of a full cycle strobe at the FCS input 43 of the cycle sequencer circuit 278. The cycle sequencer 278 outputs a signal at its QPOLL output 280 which sends out an inquiry to determine which device has initiated the interrupt signal. The QPOLL signal looks for devices on the bus which respond by asserting a slave signal. More than one device is capable of responding to the QPOLL signal. The bus master must poll each of the possible interrupt sources to determine which slave device is generated the interrupt. During the polling phase, any device that is asserted an interrupt signal and which wants to supply a vector will match its interrupt number against the one presently on the bus by asserting a slave signal if a match occurs. The slave signal is received by the interrupt arbiter 282 as shown in FIG. 39. When the QPOLL signal ends all responding slave signals are latched by the interrupt arbiter 282.

Next, the cycle sequencer circuit 278 looks for a response at its QREPLY input 284. If at least one device has replied to the QPOLL signal, an interrupt cycle is run.

If a device has responded to the interrupt query at the QREPLY input of the cycle sequencer 278, a signal is outputted from the QVECTOR output 286 back to the devices which have responded by driving a slave signal. This causes the requesting device to drive back a vector signal to indicate which interrupt is being run. In a vector phase, only one bus wire is required for both the vector request and vector grant signals. If the selected slave device does not respond to the interrupt, the bus automatically goes into an automatic vector phase which generates a request to every slave device to determine which slave device has requested an interrupt. If a slave device responds to the vector, the selected slave device will place its vector on the bus and terminate the interrupt cycle. If no device responds to the interrupt request after a predetermined amount of time, the bus master automatically terminates the interrupt cycle.

In the foregoing description, it can been seen that the present invention comprises a bus arbitration system for granting access to an expansion bus to devices following two-wire bus arbitration protocol or a three-wire bus arbitration protocol. It will be recognized by those skilled in the art that changes may be made to above-described embodiments of the invention without departing from the broad inventive concept thereof. It is understood, therefore, that this invention is not limited to the particular embodiments disclosed, but it is intended to cover all modifications which are within the scope and spirit of invention as defined by the appended claims.

I claim:

1. A bus arbitration system for granting access to an expansion bus to devices following two-wire bus arbitration protocol and to devices following three-wire bus arbitration protocol comprising:

means for receiving a plurality of bus request signals from a plurality of devices, each of said bus request signals comprising at least one coded pulse and having a predetermined priority, each of said bus request signals being used to request access to the expansion bus;

a prioritizer, for receiving said bus request signals from the receiving means and assigning respective priority levels to said bus request signals;

arbiter means comprising means for receiving the priority levels from the prioritizer, and means for determining and storing in memory which of said bus request signals has the highest priority;

means for determining whether the highest priority device has a 24 bit address, and therefore, follows three-wire bus arbitration protocol or has a 32 bit address and, therefore, follows two-wire bus arbitration protocol; and bus granting means, electrically connected to the arbiter means, for granting access to the expansion bus to the device having the highest priority independent of physical position of the device, the access being generated after a previous device, if any, has relinquished the bus, and after earlier in time bus requests have been serviced if the device having the highest priority was previously granted access to the expansion bus, whereby said arbiter means transmits from its memory to said bus granting means whether said device having the highest priority is a device following two-wire bus arbitration protocol or a device following a three-wire bus arbitration protocol, said bus granting means further including interfacing means for following two-wire bus arbitration protocol if said device follows two-wire bus arbitration protocol and for following three-wire bus arbitration protocol if the device follows three-wire bus arbitration protocol.

2. A bus arbitration system according to claim 1, wherein said prioritizer further includes assigning means for assigning devices following two-wire bus arbitration protocol a higher priority than devices following three-wire bus arbitration protocol.

3. A bus arbitration system according to claim 1, further including snooper logic means for determining whether said previous device is currently accessing the bus, said snooper means delaying said highest priority device from accessing the bus until the previous device relinquishes the bus.

4. A bus arbitration system according to claim 1, further comprising bus contention detecting means for detecting if an unauthorized device is accessing the expansion bus, and if so, signalling an error condition to the bus arbitration system.

5. A bus arbitration according to claim 1, further comprising selection means for selecting out those devices following two-wire bus arbitration protocol from those devices which follow three-wire bus arbitration protocol.

6. A bus arbitration system according to claim 1, further comprising buffered direction means for determining the direction of data flow on the expansion bus according to an instruction received by the device currently accessing the expansion bus.

7. A bus arbitration system according to claim 1, wherein said device following two-wire bus arbitration protocol is a 32 bit device.

8. A bus arbitration system according to claim 1, wherein said device following three-wire bus arbitration protocol is a 16 bit device.

9. A bus arbitration system according to claim 1, further comprising multiple transfer means for allowing a device to transfer extended cycles across the expansion bus comprising multiple 32 bit cycles.

10. A bus arbitration system according to claim 1, further comprising means for asserting a full cycle strobe, said asserting means being activated when a device following two-wire bus arbitration protocol is accessing the expansion bus and initiates a read or write cycle.

11. A bus arbitration system for granting access to an expansion bus to devices following two-wire bus arbitration protocol and to devices following three-wire bus arbitration protocol comprising:
    means for receiving a plurality of bus request signals from a plurality of devices, each of said bus request signals comprising at least one coded pulse and having a predetermined priority, each of said bus request signals being used to request access to the expansion bus;
    selection means for selecting out those devices following two-wire bus arbitration protocol from those devices which follow three-wire bus arbitration protocol;
    a prioritizer, for receiving said bus request signals from the receiving means and for assigning respective priority levels to said bus request signals;
    means for determining whether the highest priority device has a 24 bit address and, therefore, follows three-wire bus arbitration protocol or has a 32 bit address and, therefore, follows two-wire bus arbitration protocol;
    bus granting means, electrically connected to the prioritizer, for granting access to the expansion bus to the device having the highest priority independent of physical position of the device, the access being granted after a previous device, if any, has relinquished the bus, and after earlier in time bus requests have been serviced if the device having the highest priority was previously granted access to the expansion bus; and
    buffer direction means for determining the direction of data flow on the expansion bus according to an instruction received by the device currently accessing the expansion bus.

12. A bus arbitration system according to claim 11, wherein said prioritizer further includes assigning means for assigning devices following two-wire bus arbitration protocol a higher priority than devices following three-wire bus arbitration protocol.

13. A bus arbitration system according to claim 11, further comprising bus contention detecting means for detecting if an unauthorized device is accessing the expansion bus, and if so, signalling an error condition to the bus arbitration system.

14. A bus arbitration system according to claim 11, wherein said device following two-wire bus arbitration protocol is a 32 bit device.

15. A bus arbitration system according to claim 11, wherein said device following three-wire bus arbitration protocol is a 16 bit device.

16. A bus arbitration system according to claim 11, wherein said two-wire bus arbitration protocol devices and said three-wire bus arbitration protocol devices further includes interrupt generating means for generating interrupts.

17. A bus arbitration system according to claim 16, wherein said expansion bus further includes polling means for transmitting a polling inquiry after the receipt of an interrupt transmitted from said two-wire bus arbitration protocol device or said three-wire bus arbitration protocol device.

18. A bus arbitration system according to claim 17, wherein said two-wire bus arbitration protocol device or said three-wire bus arbitration protocol device further includes asserting means for asserting an interrupt response to the polling inquiry by said expansion bus.

19. A bus arbitration system according to claim 17, wherein said two-wire bus arbitration protocol device or said three-wire bus arbitration protocol device further including vector asserting means for asserting a vector in response to the polling inquiry of said expansion bus.

20. A bus arbitration system according to claim 19, wherein said expansion bus further includes terminating means for terminating the interrupt if no two-wire bus arbitration protocol device or three-wire bus arbitration protocol device responds to the polling inquiry of said expansion bus.

21. A bus arbitration system for granting access to an expansion bus to devices following two-wire bus arbitration protocol comprising:
    means for receiving a plurality of synchronous bus request signals from a plurality of devices, each of said bus request signals comprising at least one coded pulse and having a predetermined priority, each of said bus request signals being used to request access to the expansion bus;

a prioritizer, for receiving said bus request signals from the receiving means and assigning respective priority levels to said bus request signals;

arbiter means comprising means for receiving the priority levels from the prioritizer, and means for determining and storing in memory which of said bus request signals has the highest priority;

means for determining whether the highest priority device has a 24 bit address and, therefore, follows three-wire bus arbitration protocol or has a 32 bit address and, therefore, follows two-wire bus arbitration protocol; and bus granting means, electrically connected to the arbiter means, for granting access to the expansion bus to the device having the highest priority independent of physical position of the device, the access being granted after a previous device, if any, has relinquished the bus, and after earlier in time bus requests have been serviced if the device having the highest priority was previously granted access to the expansion bus, whereby said expansion bus asserts a full-cycle strobe which when activated allows the two-wire bus arbitration protocol device to access the expansion bus and initiate a read or write cycle.

22. A bus arbitration system according to claim 21, further including accessing means for allowing three-wire bus arbitration protocol devices to access the expansion bus.

23. A bus arbitration protocol device according to claim 22, wherein said prioritizer further includes assigning means for assigning devices following two-wire bus arbitration protocol a higher priority than devices following three-wire bus arbitration protocol.

24. A bus arbitration system according to claim 23, wherein said bus granting means further includes interfacing means for following two-wire bus arbitration protocol if said device follows two-wire bus arbitration protocol and for following three-wire bus arbitration protocol if the device follows three-wire bus arbitration protocol.

25. A bus arbitration system according to claim 24, further comprising selection means for selecting out those devices following two-wire bus arbitration protocol from those devices following three-wire bus arbitration protocol.

26. A bus arbitration system according to claim 24, wherein said device following two-wire bus arbitration protocol is a 32 bit device.

27. A bus arbitration system according to claim 24, wherein said device following three-wire bus arbitration protocol is a 16 bit device.

28. A bus arbitration system according to claim 21, further including snooper logic means for determining whether said previous device is currently accessing the bus, said snooper means delaying said highest priority device from accessing the bus until the previous device relinquishes the bus.

29. A bus arbitration system according to claim 21, further comprising bus contention detecting means for detecting if an unauthorized device is accessing the expansion bus, and if so, signalling an error condition to the bus arbitration system.

30. A bus arbitration system for granting access to an expansion bus to devices following a first bus arbitration protocol and to devices following a second bus arbitration protocol, comprising:

means for receiving a plurality of bus request signals from a plurality of devices, each of the bus request signals comprising at least one coded pulse and having a predetermined priority, each of the bus request signals being used to request access to the expansion bus;

a prioritizer, for receiving the bus request signals from the receiving means and for assigning respective priority levels to the bus request signals;

arbiter means comprising means for receiving the priority levels from the prioritizer, and means for determining and storing in memory which of the bus request signals has the highest priority;

means for determining whether the highest priority device has an address in accordance with the first bus arbitration protocol and, therefore, follows the first bus arbitration protocol, or has an address in accordance with the second bus arbitration protocol and, therefore, follows the second bus arbitration protocol; and bus granting means, electrically connected to the arbiter means, for granting access to the expansion bus to the device having the highest priority independent of physical position of the device, the access being generated after a previous device, if any, has relinquished the bus, and after earlier in time bus requests have been serviced if the device having the highest priority was previously granted access to the expansion bus, whereby said arbiter means transmits from its memory to said bus granting means whether said device having the highest priority is a device following the first bus arbitration protocol or a device following the second bus arbitration protocol, said bus granting means further including interacting means for following the first bus arbitration protocol if the device follows the first bus arbitration protocol, and for following the second bus arbitration protocol if the device follows the second bus arbitration protocol.

* * * * *